US011539952B2

(12) United States Patent
Egilmez et al.

(10) Patent No.: US 11,539,952 B2
(45) Date of Patent: Dec. 27, 2022

(54) IMPLICIT TRANSFORM SELECTION IN VIDEO CODING

(71) Applicant: QUALCOMM Incorporated, San Diego, CA (US)

(72) Inventors: Hilmi Enes Egilmez, San Diego, CA (US); Amir Said, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/815,920

(22) Filed: Mar. 11, 2020

(65) Prior Publication Data
US 2020/0296370 A1    Sep. 17, 2020

Related U.S. Application Data

(60) Provisional application No. 62/817,397, filed on Mar. 12, 2019.

(51) Int. Cl.
*H04N 19/122* (2014.01)
*H04N 19/593* (2014.01)
(Continued)

(52) U.S. Cl.
CPC ......... *H04N 19/122* (2014.11); *H04N 19/176* (2014.11); *H04N 19/593* (2014.11); *H04N 19/61* (2014.11)

(58) Field of Classification Search
CPC .. H04N 19/122; H04N 19/593; H04N 19/176; H04N 19/61; H04N 19/134;
(Continued)

(56) References Cited

U.S. PATENT DOCUMENTS 10,306,229 B2   5/2019  Zhao et al.
2013/0003856 A1* 1/2013  Saxena ................. H04N 19/12
                                                             375/240.18
(Continued)

FOREIGN PATENT DOCUMENTS

AU   2018202742 A1 *  5/2018   ........... H04N 19/107
CN   110392256 A     10/2019
(Continued)

OTHER PUBLICATIONS

Bross) "Versatile Video Coding (Draft 4)" JVET Meeting; 28190109-20198118; Marrakech, Mar. 9, 2019 (2019-83-09; The Joint Video Exploration Team of ISO/I EC JTC1/SC29/WG11 and ITU-T SG.16 WP 3 Document: JVET-M1001-v6 (Year: 2019).*
(Continued)

*Primary Examiner* — Dramos Kalapodas
(74) *Attorney, Agent, or Firm* — Shumaker & Sieffert, P.A.

(57) ABSTRACT

An example method includes inferring, for a current transform block of a current video block, a transform type from a plurality of transform types that includes one or more discrete cosine transforms (DCTs) and one or more discrete sine transforms (DSTs), wherein inferring the transform type comprises: determining a size of the current transform block; determining whether the current video block is partitioned using intra-subblock partitioning (ISP); and responsive to determining that the size of the current transform block is less than a threshold and that the current video block is partitioned using ISP, selecting a particular DST of the one or more DSTs as the selected transform type; transforming, using the selected transform type, the current transform block to obtain a block of reconstructed residual data for the video block; and reconstructing, based on the reconstructed residual data for the video block, the video block.

7 Claims, 12 Drawing Sheets

(51) Int. Cl.
*H04N 19/176* (2014.01)
*H04N 19/61* (2014.01)

(58) Field of Classification Search
CPC .... H04N 19/157; H04N 19/625; H04N 19/12; H04N 19/105
See application file for complete search history.

(56) References Cited

U.S. PATENT DOCUMENTS

| | | | | |
|---|---|---|---|---|
| 2014/0140393 | A1* | 5/2014 | Seregin | H04N 19/187 375/240.2 |
| 2015/0063428 | A1* | 3/2015 | Lever | H04B 7/18517 375/211 |
| 2016/0219290 | A1* | 7/2016 | Zhao | H04N 19/12 |
| 2018/0020218 | A1 | 1/2018 | Zhao et al. | |
| 2019/0373261 | A1 | 12/2019 | Egilmez et al. | |
| 2020/0099924 | A1 | 3/2020 | Seregin et al. | |
| 2021/0235077 | A1* | 7/2021 | Kim | H04N 19/159 |

FOREIGN PATENT DOCUMENTS

| | | |
|---|---|---|
| CN | 111669582 A | 9/2020 |
| EP | 3923575 A1 | 12/2021 |
| EP | 3937500 A1 | 1/2022 |
| WO | WO-2019154936 A1 | 8/2019 |
| WO | WO-2020180162 A1 * | 9/2020 ........... H04N 19/105 |
| WO | WO-2020182103 A1 | 9/2020 |

OTHER PUBLICATIONS

Bross B et al: "Versatile Video Coding (Draft 4)" JVET Meeting; 28190109-20198118; Marrakech, Mar. 9, 2019 (2019-83-09; The Joint Video Exploration Team of ISO/I EC JTC1/SC29/WG11 and ITU-T SG.16 WP 3 Document: JVET-M1001-v6 (Year: 2019).*
Over Bross B et al.: (hereinafter Brass) "Versatile Video Coding (Draft 4)" JVET Meeting; 28190109-20198118; Marrakech, Mar. 9, 2019 (2019-83-09; The Joint Video Exploration Team of ISO/I EC JTC1/SC29/WG11 and ITU-T SG.16 WP 3 Document: JVET-M1001-v6 (Year: 2019).*
Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
Bross B., et al., "Versatile Video Coding (Draft 4)", Joint Video Experts Team (JVET) of ITU-T SG 16 WP 3 and ISO/IEC JTC 1/SC 29/WG 11,13th Meeting: Marrakech, MA, Jan. 9-18, 2019, JVET-M1001-v6, 301 Pages.
Bross B., et al., "Versatile Video Coding (Draft 7)", Joint Video Experts Team (JVET) of ITU-T SG 16 WP 3 and ISO/IEC JTC 1/SC 29/WG 11, Document: JVET-P2001-VA, 16th Meeting: Geneva, CH, Oct. 1-11, 2019, 495 Pages.
Chen J., et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11, JVET-M1002-v1, Jan. 9 -18, 2019, 61 pages.
Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16); URL: http://phenix.int-evry.fr/JVET/ ,, no. JVET-A1001 Feb. 24, 2016 (Feb. 24, 2016), XP030150000, 27 pages.
Chen J., et al., "JVET -G1UU1: Algorithm Description ot Joint Exploration Test Model 7 (JEM7)", JVET-G1UU1-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, p. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2, sections 2.1.1.2.3.1.

Co-Pending U.S. Appl. No. 16/715,274, filed Dec. 16, 2019.
Egilmez H., et al., "Non-CE6: A Simplification of Implicit MTS", Joint Video Experts Team (JVET) of ITU-T SG 16 WP 3 and ISO/IEC JTC 1/SC 29/WG 11, JVET-N0419-v2, 14th Meeting: Geneva, CH, Mar. 19-27, 2019, JVET-N0419, pp.1-4.
Egilmez H., et al., "Non-CE6: A Simplification of Implicit Transform Selection in Intra-subblock Partitioning", Joint Video Experts Team (JVET) of ITU-T SG 16 WP 3 and ISO/IEC JTC 1/SC 29/WG 11, JVET-N0420-v2, 14th Meeting: Geneva, CH, Mar. 19-27, 2019, JVET-N0420, pp. 1-7.
Ergen S., "ZigBee/IEEE 802.15.4 Summary", Sep. 10, 2004, 37 Pages.
Gao H., et al., "Non-CE6: Combined Test of JVET-N0172/JVET-N0375/JVET-N0419/JVET-N0420 on Unification of Implicit Transform Selection", Joint Video Experts Team (JVET) of ITU-T SG 16 WP 3 and ISO/IEC JTC 1/SC 29/WG 11, JVET-N0866-v2, 14th Meeting: Geneva, CH, Mar. 19-27, 2019, JVET-N0866, pp. 1-6.
Han J., et al., "Towards jointly optimal spatial prediction and adaptive transform in video/image coding," IEEE International Conference on Acoustics, Speech and Signal Processing (ICASSP), pp. 726-729 (Mar. 2010).
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
"Information technology—Dynamic Adaptive Streaming over HTTP {DASH}—Part 1: Media Presentation Description and Segment Formats," ISO/IEC 23009-1, International Standard, Draft third edition, Jan. 9, 2017, 216 pp.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Jain A.K., "A Sinusoidal Family of Unitary Transforms", IEEE Transactions on Pattern Analysis and Machine Intelligence, Oct. 1, 1979, pp. 356-365, IEEE Service Center, XP011242370, ISSN: 0162-8828.
Marpe D., et al., "Transform Coding Using the Residual Quadtree (RQT)", Fraunhofer Heinrich Hertz Institute, 4pp. URL: http://www.hhi.fraunhofer.de/fields-of-competence/image-processing/researchgroups/ image-video-coding/hevc-high-efficiency-video-coding/transform-coding-using-the-residual-quadtree-rqt.html; [Retrieved on Feb. 9, 2017].
Martucci S.A., et al., "Symmetric convolution and the discrete sine and cosine transforms," IEEE Transactions on Signal Processing, vol. 42, No. 5, May 1, 1994, pp. 1038-1051, IEEE Signal Processing Society, XP000863873.
Ohm J-R., et al., "MPEG-4 Advanced Video Coding", MPEG Doc#: N7314, Jul. 2005, 11 Pages.
Wien M, "High Efficiency Video Coding, Coding Tools and specification", Chapter 5, 2015, pp. 133-160.
Zhao X., et al., "Enhanced Multiple Transform for Video Coding", Data Compression Conference, Mar. 30, 2016, XP033027689, DOI: 10.1109/DCC.2016.9 [retrieved on Dec. 15, 2016], pp. 73-82.
International Search Report and Written Opinion—PCT/US2020/022363—ISA/EPO—dated Jun. 29, 2020.
Bossen F., et al., "JVET Common Test Conditions and Software Reference Configurations for SDR video", Joint Video Experts Team (JVET) of ITU-T SG 16 WP 3 and ISO/IEC JTC 1/SC 29/WG 11, Document: JVET-M1010-V1, 13th Meeting: Marrakech, MA, Jan. 9-18, 2019, pp. 1-6.
Gao H., et al., "Non-CE6: Unification of Implicit Transform Core Selection", JVET-N0172-V4, Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0172-v3, pp. 1-10.

(56) References Cited

OTHER PUBLICATIONS

Hernandez S., et al., "CE3: Intra Sub-Partitions Coding Mode (Tests 1.1.1 and 1.1.2)", Joint Video Experts Team (JVET) of ITU-T SG 16 WP 3 and ISO/IEC JTC 1/SC 29/WG 11, Document: JVET-M0102-V5, 13th Meeting: Marrakech, MA, Jan. 9-18, 2019, pp. 1-9.

Lainema J., "CE6: Shape Adaptive Transform Selection (Test 3.1)", JVET-M0303-v2, Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0303, pp. 1-5.

Lim S., et al., "Non-CE6: Simplification on Implicit Transform Selection in ISP Mode", JVET-N0375, Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0375, pp. 1-7.

Said A., et al., "Description of Core Experiment 6 (CE6): Transforms and Transform Signalling", Joint Video Experts Team (JVET) of ITU-T SG 16 WP 3 and ISO/IEC JTC 1/SC 29/WG 11, JVET-L1026-v3, 12th Meeting: Macao, CN, Oct. 3-12, 2018, 14 pages.

Zhao X., et al., "Description of Core Experiment 6 (CE6): Transforms and Transform Signalling", Joint Video Experts Team (JVET) of ITU-T SG 16 WP 3 and ISO/IEC JTC 1/SC 29/WG 11, JVET-M1026-v4, 13th Meeting: Marrakech, MA, Jan. 9-18, 2019, 9 pages.

Bross B., et al., "Versatile Video Coding (Draft 8)," 17. JVET Meeting, Jan. 7, 2020-Jan. 17, 2020, Brussels, BE, (The Joint Video Experts Team of ISO/IEC JTC1/SC29/WG11 and ITU-TSG. 16 WP 3), No. JVET-Q2001-vD, Feb. 27, 2020 (Feb. 27, 2020), XP030285389, 514 Pages, Retrieved from the Internet: URL: http://phenix.int-evry.fr/jvet/doc_end_user/documents/17_Brussels/wg11/JVET-Q2001-v14.zip JVET-Q2001-vD.docx [retrieved on Feb. 27, 2020], Cited in the application p. 95, Section ols_mode_idc, pp. 108 (definition of sps_affine_enabled_flagandfive_minus_max_num_subblock_merge_cand) and p. 124 (equation (87)-with the lines immediately before and after it).

KR1020190025958, filed on Mar. 6, 2019, 309 Pages.

Shrestha S., et al., "Block Size Restriction in MTS Kernel for ISP and LFNST", JVET-Q0381-v3, Joint Video Experts Team (JVET) of ITU-T SG 16 WP 3 and ISO/IEC JTC 1/SC 29/WG 11, 17th Meeting, Brussels, BE, Jan. 7-17, 2020, JVET-Q0381, pp. 1-4.

\* cited by examiner

IMPLICIT TRANSFORM SELECTION IN VIDEO CODING

This application claims the benefit of U.S. Provisional Patent Application 62/817,397, filed on Mar. 12, 2019, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In one example, a method includes inferring, for a current transform block of a current video block, a transform type from a plurality of transform types that includes one or more discrete cosine transforms (DCTs) and one or more discrete sine transforms (DSTs), wherein inferring the transform type comprises: determining a size of the current transform block; determining whether the current video block is partitioned using intra-subblock partitioning (ISP); and responsive to determining that the size of the current transform block satisfies a size threshold and that the current video block is partitioned using ISP, selecting a particular DST of the one or more DSTs as the selected transform type; transforming, using the selected transform type, the current transform block to obtain a block of reconstructed residual data for the video block; and reconstructing, based on the reconstructed residual data for the video block, the video block.

In another example, a device includes a memory configured to store video blocks; and one or more processors implemented in circuitry and configured to: infer, for a current transform block of a current video block, a transform type from a plurality of transform types that includes one or more DCTs and one or more DSTs, wherein, to infer the transform type, the one or more processors are configured to: determine a size of the current transform block; determine whether the current video block is partitioned using ISP; and select, responsive to determining that the size of the current transform block satisfies a size threshold and that the current video block is partitioned using ISP, a particular DST of the one or more DSTs as the selected transform type; transform, using the selected transform type, the current transform block to obtain a block of reconstructed residual data for the video block; and reconstruct, based on the reconstructed residual data for the video block, the video block.

In another example, a computer-readable storage medium stores instructions that, when executed, cause one or more processors of a video coding device to: infer, for a current transform block of a current video block, a transform type from a plurality of transform types that includes one or more DCTs and one or more DSTs, wherein the instructions that cause the one or more processors to infer the transform type comprise instructions that cause the one or more processors to: determine a size of the current transform block; determine whether the current video block is partitioned using ISP; and select, responsive to determining that the size of the current transform block satisfies a size threshold and that the current video block is partitioned using ISP, a particular DST of the one or more DSTs as the selected transform type; transform, using the selected transform type, the current transform block to obtain a block of reconstructed residual data for the video block; and reconstruct, based on the reconstructed residual data for the video block, the video block.

The details of one or more examples of this disclosure are set forth in the accompanying drawings and the description below. Other features, objects, and advantages of various aspects of the techniques will be apparent from the description and drawings, and from the claims.

DETAILED DESCRIPTION

In general, this disclosure describes techniques for implicit transform selection in video coding. As discussed in further detail below, following prediction, such as intra-prediction or inter-prediction of a block, a video encoder may calculate residual data for the block. The residual data, such as a residual block, represents sample by sample differences between the block and a prediction block for the block, formed using the corresponding prediction mode. The video encoder may apply one or more transforms to the residual block, to produce transformed data in a transform domain instead of the sample domain. For example, the video encoder may apply a discrete cosine transform (DCT). In some examples, the video encoder may utilize different types of transforms. For instance, the video encoder may use various types of DCT.

A video decoder may apply an inverse transform when decoding the video data. Where the video coder may utilize different types of transforms, it may be necessary for the video decoder to determine which transform was used by the video encoder. In some examples, the video encoder may explicitly signal (e.g., encode a syntax element with a value that indicates) which type of transform was used when transforming the residual data. However, in some examples, it may not be desirable to explicitly signal the type of transform used (e.g., due to signaling overhead).

In accordance with one or more techniques of this disclosure, the video decoder may implicitly determine which type of transform was used when transforming the residual data. For instance, the video decoder may apply a set of rules to determine which type of transform was used when transforming the residual data based on side information available at the video decoder (e.g., either explicitly signaled or implicitly derived from signaled information). The video encoder may apply the same rules when determining which type of transform to use. As such, the video encoder and video decoder may both determine which type of transform to use without explicit signaling of the transform type.

Figure 1:
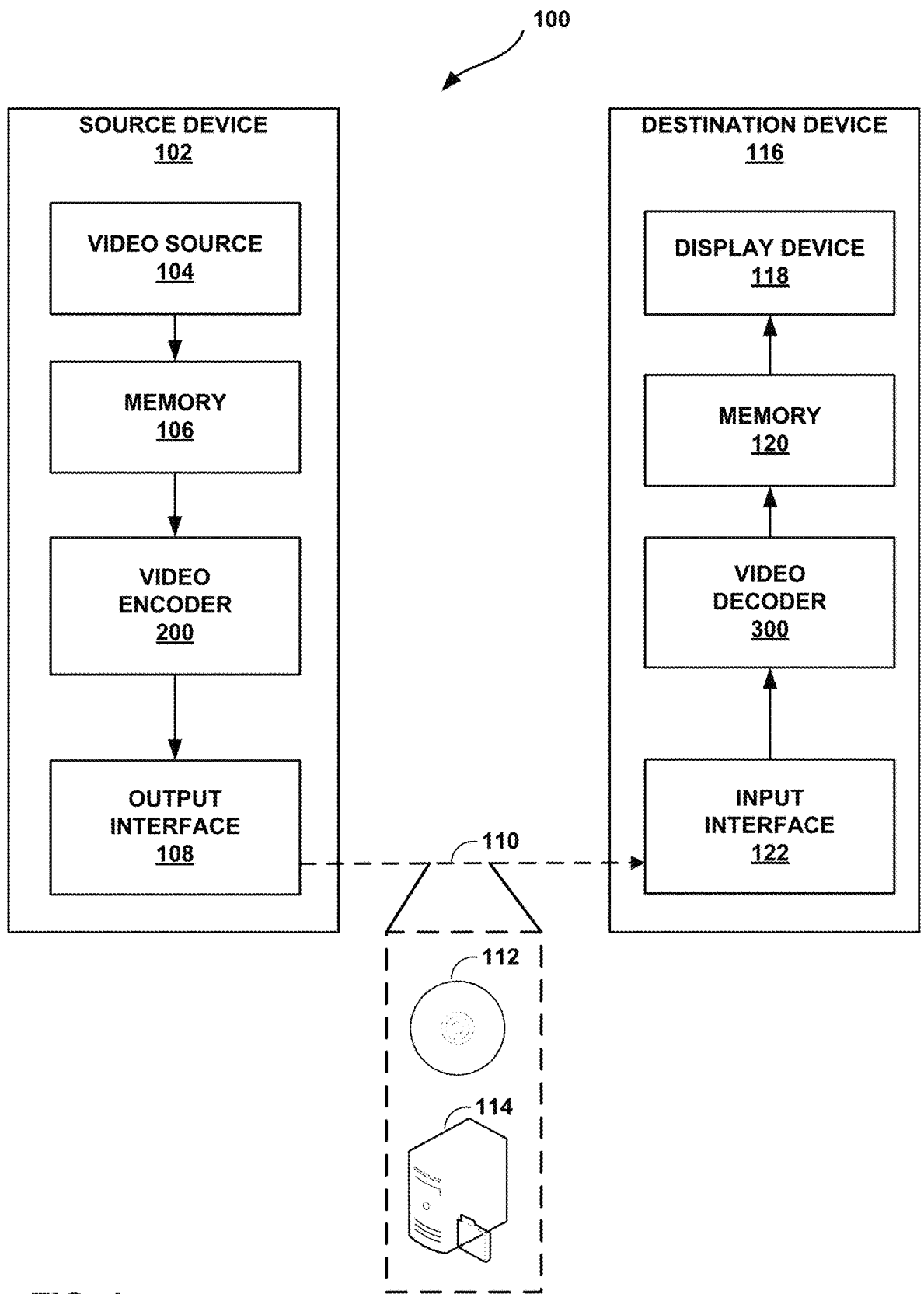
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for implicit transform selection. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for implicit transform selection. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 4)," Joint Video Experts Team (JVET) of ITU-T SG 16 WP 3 and ISO/IEC JTC 1/SC 29/WG 11, 13$^{th}$ Meeting: Marrakech, MA, 9-18 Jan. 2019, JVET-M1001-v6 (hereinafter "VVC Draft 4"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As discussed above, a video encoder, such as video encoder 200, may apply various types of transforms to transform the residual data. The following is an overview of discrete sine and cosine transforms (DCTs and DSTs). Also, the transform scheme used in HEVC standard is briefly discussed.

Discrete sine and cosine transforms.

Transform indicates the process of deriving an alternative representation of the input signal. Given an N-point vector $x=[x_0, x_1, \ldots, x_{N-1}]^T$ and a set of given vectors $\{\Phi_0, \Phi_1, \ldots, \Phi_{M-1}\}$, x can be approximated or exactly represented using a linear combination of $\Phi_0, \Phi_1, \ldots, \Phi_{M-1}$, which can be formulated as follows, $$\hat{x} = \sum_{i=0}^{M-1} f_i \cdot \Phi_i$$

where $\hat{x}$ can be an approximation or equivalent of x, vector $f=[f_1, f_2, \ldots, f_{M-1}]$ is called the transform coefficient vector and $\{\Phi_0, \Phi_1, \ldots, \Phi_{M-1}\}$ are the transform basis vectors.

In the scenario of video coding, transform coefficients are roughly non-correlated and sparse, i.e., the energy of the input vector x is compacted only on a few transform coefficients, and the remaining majority transform coefficients are typically close to 0.

Given the specific input data, the optimal transform in terms of energy compaction is the so-called Karhunen-Loeve transform (KLT), which uses the eigen vectors of the covariance matrix of the input data as the transform basis vectors. Therefore, KLT is actually a data-dependent transform and does not have a general mathematical formulation. However, under certain assumptions, e.g., the input data forms a first-order stationary Markov processes, it has been proved in the literature that the corresponding KLT is actually a member of the sinusoidal family of unitary transforms. The sinusoidal family of unitary transforms indicates transforms using transform basis vectors formulated as follows:

$$\Phi_m(k)=A \cdot e^{ike}+B^{-ike}$$

where e is the base of the natural logarithm approximately equal to 2.71828, A, B, and θ are complex in general, and depend on the value of m.

Example transforms include the discrete Fourier, cosine, sine, and the KLT (for first-order stationary Markov processes) are members of this sinusoidal family of unitary transforms. According to S. A. Martucci, "Symmetric convolution and the discrete sine and cosine transforms," IEEE Trans. Sig. Processing SP-42, 1038-1051 (1994), the complete set of discrete cosine transform (DCT) and discrete sine transform (DST) families includes totally 16 transforms based on different types, i.e., different values of A, B, and θ, and a complete definition of the different types of DCT and DST are given below, Assume the input N-point vector is denoted as $x=[x_0, x_1, \ldots, x_{N-1}]^T$, and it is transformed to another N-point transform coefficient vector denoted as $y=[y_0, y_1, \ldots, y_{N-1}]^T$ by multiplying a matrix, the process of which can be further illustrated according to one of the following transform formulation, wherein k ranges from 0 through N−1, inclusive:

DCT Type-I (DCT-1):

$$y_k = \sum_{n=0}^{N-1} \sqrt{\frac{2}{N-1}} \cos\left(\frac{\pi \cdot n \cdot k}{N-1}\right) \cdot w_0 \cdot w_1 \cdot x_n,$$

$$\text{where } w_0 = \begin{cases} \frac{1}{\sqrt{2}}, & \text{if } n=0 \text{ or } n=N-1 \\ 1, & \text{otherwise} \end{cases},$$

$$w_1 = \begin{cases} \frac{1}{\sqrt{2}}, & \text{if } k=0 \text{ or } k=N-1 \\ 1, & \text{otherwise} \end{cases}$$

DCT Type-II (DCT-2):

$$y_k = \sum_{n=0}^{N-1} \sqrt{\frac{2}{N}} \cos\left(\frac{\pi \cdot (n+0.5) \cdot k}{N-1}\right) \cdot w_0 \cdot x_n,$$

where $w_0 = \begin{cases} \frac{1}{\sqrt{2}}, & \text{if } k = 0 \\ 1, & \text{otherwise} \end{cases}$ DCT Type-III (DCT-3):

$$y_k = \sum_{n=0}^{N-1} \sqrt{\frac{2}{N}} \cos\left(\frac{\pi \cdot n + (k+0.5)}{N-1}\right) \cdot w_0 \cdot x_n,$$

where $w_0 = \begin{cases} \frac{1}{\sqrt{2}}, & \text{if } n = 0 \\ 1, & \text{otherwise} \end{cases}$ DCT Type-IV (DCT-4):

$$y_k = \sum_{n=0}^{N-1} \sqrt{\frac{2}{N}} \cos\left(\frac{\pi \cdot (n+0.5) \cdot (k+0.5)}{N}\right) \cdot x_n,$$

DCT Type-V (DCT-5):

$$y_k = \sum_{n=0}^{N-1} \sqrt{\frac{2}{N-0.5}} \cos\left(\frac{\pi \cdot n \cdot k}{N-0.5}\right) \cdot w_0 \cdot w_1 \cdot x_n,$$

where $w_0 = \begin{cases} \frac{1}{\sqrt{2}}, & \text{if } n = 0 \\ 1, & \text{otherwise} \end{cases}$, $w_1 = \begin{cases} \frac{1}{\sqrt{2}}, & \text{if } k = 0 \\ 1, & \text{otherwise} \end{cases}$ DCT Type-VI (DCT-6):

$$y_k = \sum_{n=0}^{N-1} \sqrt{\frac{2}{N-0.5}} \cos\left(\frac{\pi \cdot (n+0.5) \cdot k}{N-0.5}\right) \cdot w_0 \cdot w_1 \cdot x_n,$$

where $w_0 = \begin{cases} \frac{1}{\sqrt{2}}, & \text{if } n = N-1 \\ 1, & \text{otherwise} \end{cases}$, $w_1 = \begin{cases} \frac{1}{\sqrt{2}}, & \text{if } k = 0 \\ 1, & \text{otherwise} \end{cases}$ DCT Type-VII (DCT-7):

$$y_k = \sum_{n=0}^{N-1} \sqrt{\frac{2}{N-0.5}} \cos\left(\frac{\pi \cdot n \cdot (k+0.5)}{N-0.5}\right) \cdot w_0 \cdot w_1 \cdot x_n,$$

where $w_0 = \begin{cases} \frac{1}{\sqrt{2}}, & \text{if } n = 0 \\ 1, & \text{otherwise} \end{cases}$, $w_1 = \begin{cases} \frac{1}{\sqrt{2}}, & \text{if } k = N-1 \\ 1, & \text{otherwise} \end{cases}$ DCT Type-VIII (DCT-8):

$$y_k = \sum_{n=0}^{N-1} \sqrt{\frac{2}{N+0.5}} \cos\left(\frac{\pi \cdot (n+0.5) \cdot (k+0.5)}{N+0.5}\right) \cdot x_n,$$

DST Type-I (DST-1):

$$y_k = \sum_{n=0}^{N-1} \sqrt{\frac{2}{N+1}} \sin\left(\frac{\pi \cdot (n+1) \cdot (k+1)}{N+1}\right) \cdot x_n,$$

DST Type-II (DST-2):

$$y_k = \sum_{n=0}^{N-1} \sqrt{\frac{2}{N}} \sin\left(\frac{\pi \cdot (n+0.5) \cdot (k+1)}{N}\right) \cdot w_0 \cdot x_n,$$

where $w_0 = \begin{cases} \frac{1}{\sqrt{2}}, & \text{if } k = N-1 \\ 1, & \text{otherwise} \end{cases}$ DST Type-III (DST-3):

$$y_k = \sum_{n=0}^{N-1} \sqrt{\frac{2}{N}} \sin\left(\frac{\pi \cdot (n+1) \cdot (k+0.5)}{N}\right) \cdot w_0 \cdot x_n,$$

where $w_0 = \begin{cases} \frac{1}{\sqrt{2}}, & \text{if } n = N-1 \\ 1, & \text{otherwise} \end{cases}$ DST Type-IV (DST-4):

$$y_k = \sum_{n=0}^{N-1} \sqrt{\frac{2}{N}} \sin\left(\frac{\pi \cdot (n+0.5) \cdot (k+0.5)}{N}\right) \cdot x_n,$$

DST Type-V (DST-5):

$$y_k = \sum_{n=0}^{N-1} \sqrt{\frac{2}{N+0.5}} \sin\left(\frac{\pi \cdot (n+1) \cdot (k+1)}{N+0.5}\right) \cdot x_n,$$

DST Type-VI (DST-6):

$$y_k = \sum_{n=0}^{N-1} \sqrt{\frac{2}{N+0.5}} \sin\left(\frac{\pi \cdot (n+0.5) \cdot (k+1)}{N+0.5}\right) \cdot x_n,$$

DST Type-VII (DST-7):

$$y_k = \sum_{n=0}^{N-1} \sqrt{\frac{2}{N+0.5}} \sin\left(\frac{\pi \cdot (n+1) \cdot (k+0.5)}{N+0.5}\right) \cdot x_n,$$

DST Type-VIII (DST-8):

$$y_k = \sum_{n=0}^{N-1} \sqrt{\frac{2}{N-0.5}} \cos\left(\frac{\pi \cdot (n+0.5) \cdot (k+0.5)}{N-0.5}\right) \cdot w_0 \cdot w_1 \cdot x_n,$$

where $w_0 = \begin{cases} \frac{1}{\sqrt{2}}, & \text{if } n = N-1 \\ 1, & \text{otherwise} \end{cases}$, $w_1 = \begin{cases} \frac{1}{\sqrt{2}}, & \text{if } k = N-1 \\ 1, & \text{otherwise} \end{cases}$ The transform type is specified by the mathematical formulation of the transform basis function, e.g., 4-point DST-VII and 8-point DST-VII have the same transform type, regardless the value of N.

Without loss of generality, all the above transform types can be represented using the below generalized formulation:

$$y_m = \Sigma_{n=0}^{N-1} T_{m,n} \cdot x_n,$$

where T is the transform matrix specified by the definition of one certain transform, e.g., DCT Type-I~DCT Type-VIII, or DST Type-I~DST Type-VIII, and the row vectors of T, e.g., $[T_{i,0}, T_{i,1}, \ldots, T_{i,N-1}]$ are the $i^{th}$ transform basis vectors. A transform applied on the N-point input vector is called an N-point transform.

It is also noted that, the above transform formulations, which are applied on the 1-D input data x, can be represented in matrix multiplication form as below $$y = T \cdot x$$

where T indicates the transform matrix, x indicates the input data vector, and y indicates the output transform coefficients vector.

Transform for 2-Dimensional (2-D) input data.

The transforms as introduced in the previous section are applied on 1-D input data, and transforms can be also extended for 2-D input data sources. Supposing X is an input M×N data array. The typical methods of applying transform on 2-D input data include the separable and non-separable 2-D transforms.

A separable 2-D transform applies 1-D transforms for the horizontal and vertical vectors of X sequentially, formulated as below:

$$Y = C \cdot X \cdot R^T$$

where C and R denotes the given M×M and N×N transform matrices, respectively. From the formulation, it can be seen that C applies 1-D transforms for the column vectors of X, while R applies 1-D transforms for the row vectors of X In the later part of this document, for simplicity denote C and R as left (vertical) and right (horizontal) transforms and they both form a transform pair. There are cases when C is equal to R and is an orthogonal matrix. In such a case, the separable 2-D transform is determined by just one transform matrix.

A non-separable 2-D transform first reorganized all the elements of X into a single vector, namely X', by doing the following mathematical mapping as an example:

$$X'_{(i \cdot N + j)} = X_{i,j}$$

Then a 1-D transform T' is applied for X' as below:

$$Y = T' \cdot X$$

where T' is an (M*N)×(M*N) transform matrix.

In video coding, separable 2-D transforms may be applied as it may utilize much less operation (addition, multiplication) counts as compared to 1-D transform.

In conventional video codecs, such as H.264/AVC, an integer approximation of the 4-point and 8-point Discrete Cosine Transform (DCT) Type-II is always applied for both Intra and Inter prediction residual. To better accommodate the various statistics of residual samples, more flexible types of transforms other than DCT Type-II are utilized in newer video codecs. For example, in HEVC, an integer approximation of the 4-point Type-VII Discrete Sine Transform (DST) is utilized for Intra prediction residual, which is both theoretically proved and experimentally validated that DST Type-VII is more efficient than DCT Type-II for residuals vectors generated along the Intra prediction directions, e.g., DST Type-VII is more efficient than DCT Type-II for row residual vectors generated by the horizontal Intra prediction direction. In HEVC, an integer approximation of 4-point DST Type-VII is applied only for 4×4 luma Intra prediction residual blocks. The 4-point DST-VII used in HEVC is shown below, 4×4 DST-VII:
{29, 55, 74, 84}
{74, 74, 0, −74}
{84, −29, −74, 55}
{55, −84, 74, −29}

In HEVC, for residual blocks that are not 4×4 luma Intra prediction residual blocks, integer approximations of the 4-point, 8-point, 16-point and 32-point DCT Type-II are also applied, as shown below:

4-point DCT-II:
{64, 64, 64, 64}
{83, 36, −36, −83}
{64, −64, −64, 64}
{36, −83, 83, −36}

8-point DCT-II:
{64, 64, 64, 64, 64, 64, 64, 64}
{89, 75, 50, 18, −18, −50, −75, −89}
{83, 36, −36, −83, −83, −36, 36, 83}
{75, −18, −89, −50, 50, 89, 18, −75}
{64, −64, −64, 64, 64, −64, −64, 64}
{50, −89, 18, 75, −75, −18, 89, −50}
{36, −83, 83, −36, −36, 83, −83, 36}
{18, −50, 75, −89, 89, −75, 50, −18}

16-point DCT-II:
{64, 64, 64, 64, 64, 64, 64, 64, 64, 64, 64, 64, 64, 64, 64, 64}
{90, 87, 80, 70, 57, 43, 25, 9, −9, −25, −43, −57, −70, −80, −87, −90}
{89, 75, 50, 18, −18, −50, −75, −89, −89, −75, −50, −18, 18, 50, 75, 89}
{87, 57, 9, −43, −80, −90, −70, −25, 25, 70, 90, 80, 43, −9, −57, −87}
{83, 36, −36, −83, −83, −36, 36, 83, 83, 36, −36, −83, −83, −36, 36, 83}
{80, 9, −70, −87, −25, 57, 90, 43, −43, −90, −57, 25, 87, 70, −9, −80}
{75, −18, −89, −50, 50, 89, 18, −75, −75, 18, 89, 50, −50, −89, −18, 75}
{70, −43, −87, 9, 90, 25, −80, −57, 57, 80, −25, −90, −9, 87, 43, −70}
{64, −64, −64, 64, 64, −64, −64, 64, 64, −64, −64, 64, 64, −64, −64, 64}
{57, −80, −25, 90, −9, −87, 43, 70, −70, −43, 87, 9, −90, 25, 80, −57}
{50, −89, 18, 75, −75, −18, 89, −50, −50, 89, −18, −75, 75, 18, −89, 50}
{43, −90, 57, 25, −87, 70, 9, −80, 80, −9, −70, 87, −25, −57, 90, −43}
{36, −83, 83, −36, −36, 83, −83, 36, 36, −83, 83, −36, −36, 83, −83, 36}
{25, −70, 90, −80, 43, 9, −57, 87, −87, 57, −9, −43, 80, −90, 70, −25}
{18, −50, 75, −89, 89, −75, 50, −18, −18, 50, −75, 89, −89, 75, −50, 18}
{9, −25, 43, −57, 70, −80, 87, −90, 90, −87, 80, −70, 57, −43, 25, −9}

32-point DCT-II:
{64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64, 64}
{90, 90, 88, 85, 82, 78, 73, 67, 61, 54, 46, 38, 31, 22, 13, 4, −4, −13, −22, −31, −38, −46, −54, −61, −67, −73, −78, −82, −85, −88, −90, −90}

{90, 87, 80, 70, 57, 43, 25, 9, −9, −25, −43, −57, −70, −80, −87, −90, −90, −87, −80, −70, −57, −43, −25, −9, 9, 25, 43, 57, 70, 80, 87, 90}
{90, 82, 67, 46, 22, −4, −31, −54, −73, −85, −90, −88, −78, −61, −38, −13, 13, 38, 61, 78, 88, 90, 85, 73, 54, 31, 4, −22, −46, −67, −82, −90}
{88, 67, 31, −13, −54, −82, −90, −78, −46, −4, 38, 73, 90, 85, 61, 22, −22, −61, −85, −90, −73, −38, 4, 46, 78, 90, 82, 54, 13, −31, −67, −88}
{87, 57, 9, −43, −80, −90, −70, −25, 25, 70, 90, 80, 43, −9, −57, −87, −87, −57, −9, 43, 80, 90, 70, 25, −25, −70, −90, −80, −43, 9, 57, 87}
{85, 46, −13, −67, −90, −73, −22, 38, 82, 88, 54, −4, −61, −90, −78, −31, 31, 78, 90, 61, 4, −54, −88, −82, −38, 22, 73, 90, 67, 13, −46, −85}
{83, 36, −36, −83, −83, −36, 36, 83, 83, 36, −36, −83, −83, −36, 36, 83, 83, 36, −36, −83, −83, −36, 36, 83, 83, 36, −36, −83, −83, −36, 36, 83}
{82, 22, −54, −90, −61, 13, 78, 85, 31, −46, −90, −67, 4, 73, 88, 38, −38, −88, −73, −4, 67, 90, 46, −31, −85, −78, −13, 61, 90, 54, −22, −82}
{80, 9, −70, −87, −25, 57, 90, 43, −43, −90, −57, 25, 87, 70, −9, −80, −80, −9, 70, 87, 25, −57, −90, −43, 43, 90, 57, −25, −87, −70, 9, 80}
{78, −4, −82, −73, 13, 85, 67, −22, −88, −61, 31, 90, 54, −38, −90, −46, 46, 90, 38, −54, −90, −31, 61, 88, 22, −67, −85, −13, 73, 82, 4, −78}
{73, −31, −90, −22, 78, 67, −38, −90, −13, 82, 61, −46, −88, −4, 85, 54, −54, −85, 4, 88, 46, −61, −82, 13, 90, 38, −67, −78, 22, 90, 31, −73}
{70, −43, −87, 9, 90, 25, −80, −57, 57, 80, −25, −90, −9, 87, 43, −70, −70, 43, 87, −9, −90, −25, 80, 57, −57, −80, 25, 90, 9, −87, −43, 70}
{67, −54, −78, 38, 85, −22, −90, 4, 90, 13, −88, −31, 82, 46, −73, −61, 61, 73, −46, −82, 31, 88, −13, −90, −4, 90, 22, −85, −38, 78, 54, −67}
{64, −64, −64, 64, 64, −64, −64, 64, 64, −64, −64, 64, 64, −64, −64, 64, 64, −64, −64, 64, 64, −64, −64, 64, 64, −64, −64, 64, 64, −64, −64, 64}
{61, −73, −46, 82, 31, −88, −13, 90, −4, −90, 22, 85, −38, −78, 54, 67, −67, −54, 78, 38, −85, −22, 90, 4, −90, 13, 88, −31, −82, 46, 73, −61}
{57, −80, −25, 90, −9, −87, 43, 70, −70, −43, 87, 9, −90, 25, 80, −57, −57, 80, 25, −90, 9, 87, −43, −70, 70, 43, −87, −9, 90, −25, −80, 57}
{54, −85, −4, 88, −46, −61, 82, 13, −90, 38, 67, −78, −22, 90, −31, −73, 73, 31, −90, 22, 78, −67, −38, 90, −13, −82, 61, 46, −88, 4, 85, −54}
{46, −90, 38, 54, −90, 31, 61, −88, 22, 67, −85, 13, 73, −82, 4, 78, −78, −4, 82, −73, −13, 85, −67, −22, 88, −61, −31, 90, −54, −38, 90, −46}
{43, −90, 57, 25, −87, 70, 9, −80, 80, −9, −70, 87, −25, −57, 90, −43, −43, 90, −57, −25, 87, −70, −9, 80, −80, 9, 70, −87, 25, 57, −90, 43}
{25, −70, 90, −80, 43, 9, −57, 87, −87, 57, −9, −43, 80, −90, 70, −25, −25, 70, −90, 80, −43, −9, 57, −87, 87, −57, 9, 43, −80, 90, −70, 25}
{22, −61, 85, −90, 73, −38, −4, 46, −78, 90, −82, 54, −13, −31, 67, −88, 88, −67, 31, 13, −54, 82, −90, 78, −46, 4, 38, −73, 90, −85, 61, −22}
{13, −38, 61, −78, 88, −90, 85, −73, 54, −31, 4, 22, −46, 67, −82, 90, −90, 82, −67, 46, −22, −4, 31, −54, 73, −85, 90, −88, 78, −61, 38, −13}
{9, −25, 43, −57, 70, −80, 87, −90, 90, −87, 80, −70, 57, −43, 25, −9, −9, 25, −43, 57, −70, 80, −87, 90, −90, 87, −80, 70, −57, 43, −25, 9}
{4, −13, 22, −31, 38, −46, 54, −61, 67, −73, 78, −82, 85, −88, 90, −90, 90, −90, 88, −85, 82, −78, 73, −67, 61, −54, 46, −38, 31, −22, 13, −4}

Transform scheme based on residual quadtree in HEVC.

To adapt the various characteristics of the residual blocks, a transform coding structure using the residual quadtree (RQT) is applied in HEVC, which is briefly described in http://www.hhi.fraunhofer.de/fields-of-competence/image-processing/research-groups/image-video-coding/hevc-high-efficiency-video-coding/transform-coding-using-the-residual-quadtree-rqt.html. In RQT, each picture is divided into coding tree units (CTU), which are coded in raster scan order for a specific tile or slice. A CTU is a square block and represents the root of a quadtree, i.e., the coding tree. The CTU size may range from 8×8 to 64×64 luma samples, but typically 64×64 is used. Each CTU can be further split into smaller square blocks called coding units (CUs). After the CTU is split recursively into CUs, each CU is further divided into prediction units (PU) and transform units (TU).

The partitioning of a CU into TUs may be carried out recursively based on a quadtree approach, therefore the residual signal of each CU is coded by a tree structure namely, the residual quadtree (RQT). The RQT allows TU sizes from 4×4 up to 32×32 luma samples. FIG. 2C shows an example where a CU includes 10 TUs, labeled with the letters a to j, and the corresponding block partitioning. Each node of the RQT is actually a transform unit (TU). The individual TUs may be processed in depth-first tree traversal order, which is illustrated in the figure as alphabetical order, which follows a recursive Z-scan with depth-first traversal.

The quadtree approach enables the adaptation of the transform to the varying space-frequency characteristics of the residual signal. Typically, larger transform block sizes, which have larger spatial support, provide better frequency resolution. However, smaller transform block sizes, which have smaller spatial support, may provide better spatial resolution. The trade-off between the two, spatial and frequency resolutions, may be chosen by the encoder mode decision, for example based on rate-distortion optimization technique. The video coder may perform a rate-distortion optimization technique to calculate a weighted sum of coding bits and reconstruction distortion, i.e., the rate-distortion cost, for each coding mode (e.g., a specific RQT splitting structure), and select the coding mode with least rate-distortion cost as the best mode.

Three parameters may be defined in the RQT: the maximum depth of the tree, the minimum allowed transform size and the maximum allowed transform size. The minimum and maximum transform sizes can vary within the range from 4×4 to 32×32 samples, which correspond to the supported block transforms mentioned in the previous paragraph. The maximum allowed depth of the RQT restricts the number of TUs. A maximum depth equal to zero means that a CB cannot be split any further if each included TB reaches the maximum allowed transform size, e.g., 32×32.

All these parameters interact and influence the RQT structure. Consider a case, in which the root CB size is 64×64, the maximum depth is equal to zero and the maximum transform size is equal to 32×32. In this case, the CB has to be partitioned at least once, since otherwise it would lead to a 64×64 TB, which is not allowed. The RQT parameters, i.e. maximum RQT depth, minimum and maximum transform size, are transmitted in the bitstream at the sequence parameter set level. Regarding the RQT depth, different values can be specified and signaled for intra and inter coded CUs.

The quadtree transform is applied for both Intra and Inter residual blocks. Typically the DCT-II transform of the same size of the current residual quadtree partition is applied for a residual block. However, if the current residual quadtree block is 4×4 and is generated by Intra prediction, the above 4×4 DST-VII transform is applied.

In HEVC, larger size transforms, e.g., 64×64 transform are not adopted mainly due to its limited benefit considering and relatively high complexity for relatively smaller resolution videos.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a video coder (i.e., video encoder 200 and/or video decoder 300) may derive, for a current coefficient block of a video block, a transform type from a plurality of transform types. The video coder may transform, using the selected transform type, the current transform block (e.g., coefficient block) to obtain a block of reconstructed residual data for the video block; and reconstruct, based on the reconstructed residual data for the video block, the video block.

The video coder may infer the transform type based on factors other than an express signaling of the transform type. As such, the video coder may omit coding of a syntax element that expressly identifies the transform type for a current block. Some examples of factors from which the video coder may infer the transform type include, a size of the current block (e.g., a height and/or a width of the current block), whether the current block is partitioned using intra-subblock partitioning (ISP), and an intra mode of the current block. The video coder may infer the transform type based on any combination of factors. For instance, the video coder may infer the transform type for a current transform block of a current video block based on a size of the current transform block and whether the current video block is partitioned using ISP. In at least some of such examples, the video coder may infer the transform type for the current transform block regardless of an intra prediction mode used to predict the current video block.

The video coder may select the transform type from a plurality of transform types that includes one or more discrete cosine transforms (DCTs) and one or more discrete sine transforms (DSTs). As discussed in further detail below, the one or more DCTs may include one or more of a DCT-1, a DCT-2, a DCT-3, a DCT-4, a DCT-5, a DCT-6, a DCT-7, and a DCT-8, and/or the one or more DSTs may include one or more of a DST-1, a DST-2, a DST-3, a DST-4, a DST-5, a DST-6, a DST-7, and a DST-8.

As discussed above, the video coder may infer the transform type for a current transform block based on a size of the current transform block. For instance, the video coder may select a first transform type for the current transform block responsive to determining that the size of the current transform block satisfies a size threshold and select a second transform type for the current transform block responsive to determining that the size of the current transform block does not satisfy the size threshold. In some examples, the video coder may determine whether the size of the current transform block satisfies the size threshold by comparing the size of the current transform block to a single threshold value. In other examples, the video coder may determine whether the size of the current transform block satisfies the size threshold by determining whether the size of the current transform block is greater than a lower bound (e.g., 2, 4, 6) and less than an upper bound (e.g., 8, 16, 32). If the size of the current transform block is greater than the lower bound and less than the upper bound, the video coder may determine that the size of the current transform block satisfies the size threshold. Similarly, if the size of the current transform block is less than the lower bound or greater than the upper bound, the video coder may determine that the size of the current transform block does not satisfy the size threshold.

Where the current video block is coding unit (CU), the CU may be partitioned into a plurality of sub-partitions using ISP. Each of the sub-partitions may have an associated transform block. As such, where the CU is partitioned using ISP, a plurality of transform blocks may be associated with the CU. For instance, a 16×16 CU may be vertically partitioned into four partitions of size 4×16, each of which is associated with a transform block of size 4×16.

As discussed above, the video coder may infer the transform type for a current transform block of a current video block based on whether the current video block is partitioned using ISP and based on a size of the current transform block. As one example, responsive to determining that the size of the current transform block satisfies a size threshold and that the current video block is partitioned using ISP, the video coder may select a particular DST of the one or more DSTs (e.g., DST-7) as the transform type for the current transform block. As another example, responsive to determining that the size of the current transform block does not satisfy the size threshold and that the current video block is partitioned using ISP, the video coder may select a particular DCT of the one or more DCTs (e.g., DCT-2) as the transform type for the current transform block. In either of the aforementioned examples, the video coder may select the transform type comprises selecting the transform type regardless of an intra prediction mode used to predict the current video block (e.g., regardless of the angular, DC, or planar mode used to intra predict the current video).

In some examples, the video coder may always perform the transform type inference. In other examples, the video coder may perform the transform type inference under certain conditions. For instance, the video coder may infer the transform type for the current transform block responsive to determining that multiple transform selection (MTS) is enabled for the current video block. The video coder may, in some examples, determine whether MTS is enabled for the current video block based on the values of one or more syntax elements (e.g., sps_explicit_mts_intra_enabled_flag).

The video coder may, in some examples, infer a transform type for performing horizontal transformations (i.e., a transform type for horizontal use) and infer a transform type for performing vertical transformations (i.e., a transform type for vertical use). The video coder may infer the transform types for horizontal and vertical use using a common algorithm. For instance, the video coder may infer the transform type for horizontal use based on whether a width of a current transform block satisfies a width size threshold and whether a current video block that includes the current transform block is partitioned using ISP, and infer the transform type for vertical use based on whether a height of the current transform block satisfies a height size threshold and whether the current video block that includes the current transform block is partitioned using ISP. In some examples, the video coder may use the same size threshold for both horizontal and vertical transform type inferences. For instance, where the size thresholds include an upper bound and a lower bound, the upper and lower bounds of the width size threshold may be equal to the upper and lower bounds of the height size threshold. As one specific example, the lower bound of both width and height thresholds may be 4 and the upper bound of both width and height thresholds may be 16.

In some examples, to derive (i.e., infer) the transform type for the current coefficient block, the video coder may select the DST-7 transform to transform any row or column with less than or equal to a threshold (e.g., 8, 16, 32) number of samples (e.g., luma samples) and select the DCT-2 transform to transform any row or column with greater than the threshold number of samples.

Relative to VVC Draft 4 (e.g., JVET-M1001), an example of the proposed change can be achieved by replacing the Table 8-15 with the following:

trTypeHor=(nTbW>=2 && nTbW<=16)?1:0 trTypeVer=(nTbH>=2 && nTbH<=16)?1:0 where "0" and "1" denote DCT-2 and DST-7 respectively.

Blocks partitioned using ISP may be prohibited from having rows/columns with only two samples. As such, this disclosure proposes a 2-point DST-7. The entries of the 2-point DST-7 matrix may be as follows (which only introduces 4-bytes of additional memory):

{48 77}

{77 −48}

Alternatively, an example of the proposed change can be achieved by modifying VVC Draft 4 as follows:

trTypeHor=(nTbW>=4 && nTbW<=16 && nTbW<=nTbH)?1:0　　(8-1029)

trTypeVer=(nTbH>=4 && nTbH<=16 && nTbH<=nTbW)?1:0　　(8-1030)

where "0" and "1" denote DCT-2 and DST-7 respectively and the changes (i.e., deleted portions) are in underline and italics.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
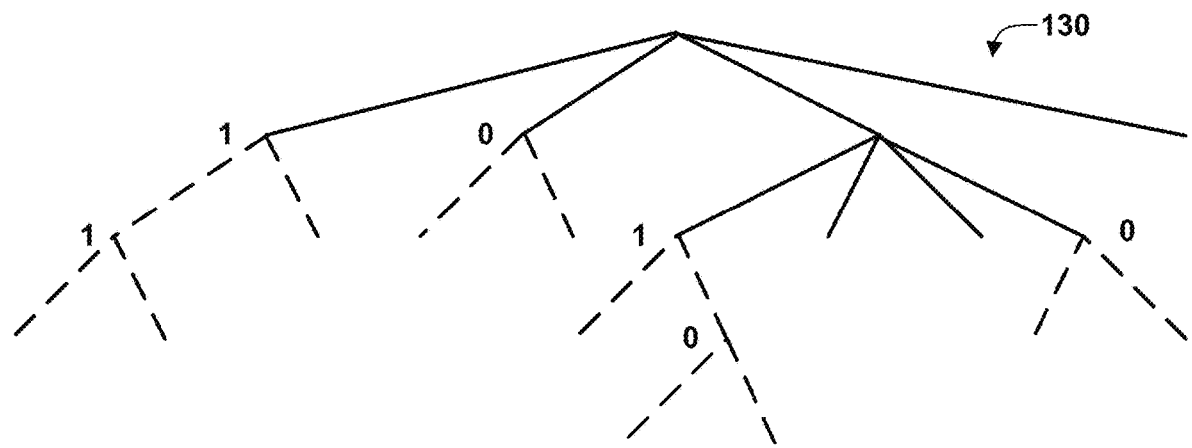
FIGS. 2A and 2B are conceptual diagrams illustrating an example quadtree binary tree (QTBT) structure, and a corresponding coding tree unit (CTU).
Figure 2B:
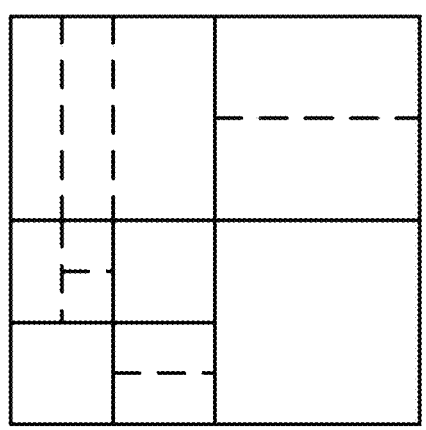
Figure 2C:
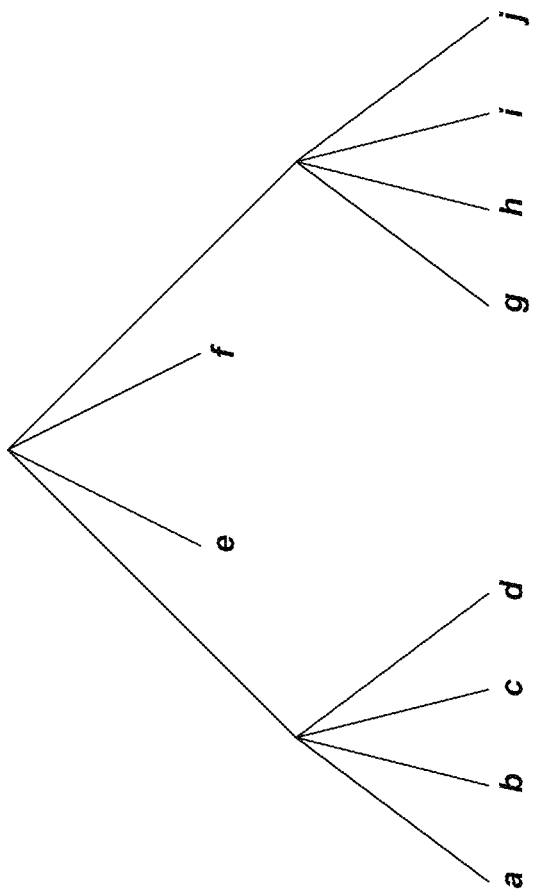
FIG. 2C is a conceptual diagram illustrating another example quadtree structure and corresponding tree unit.
Figure 2C:
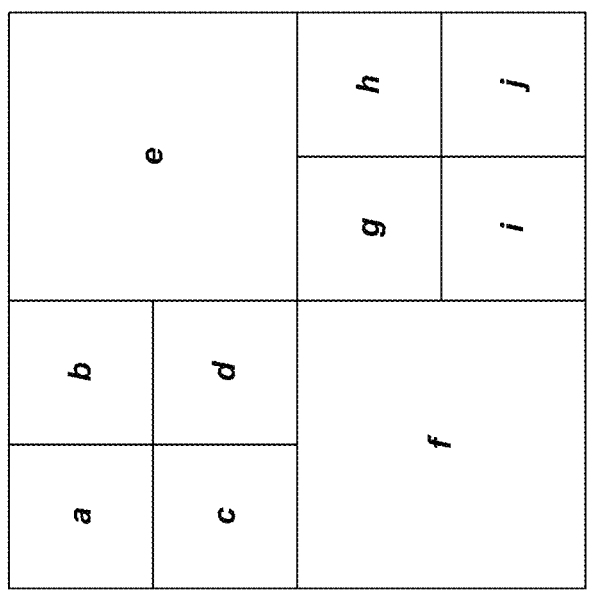

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example.

For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
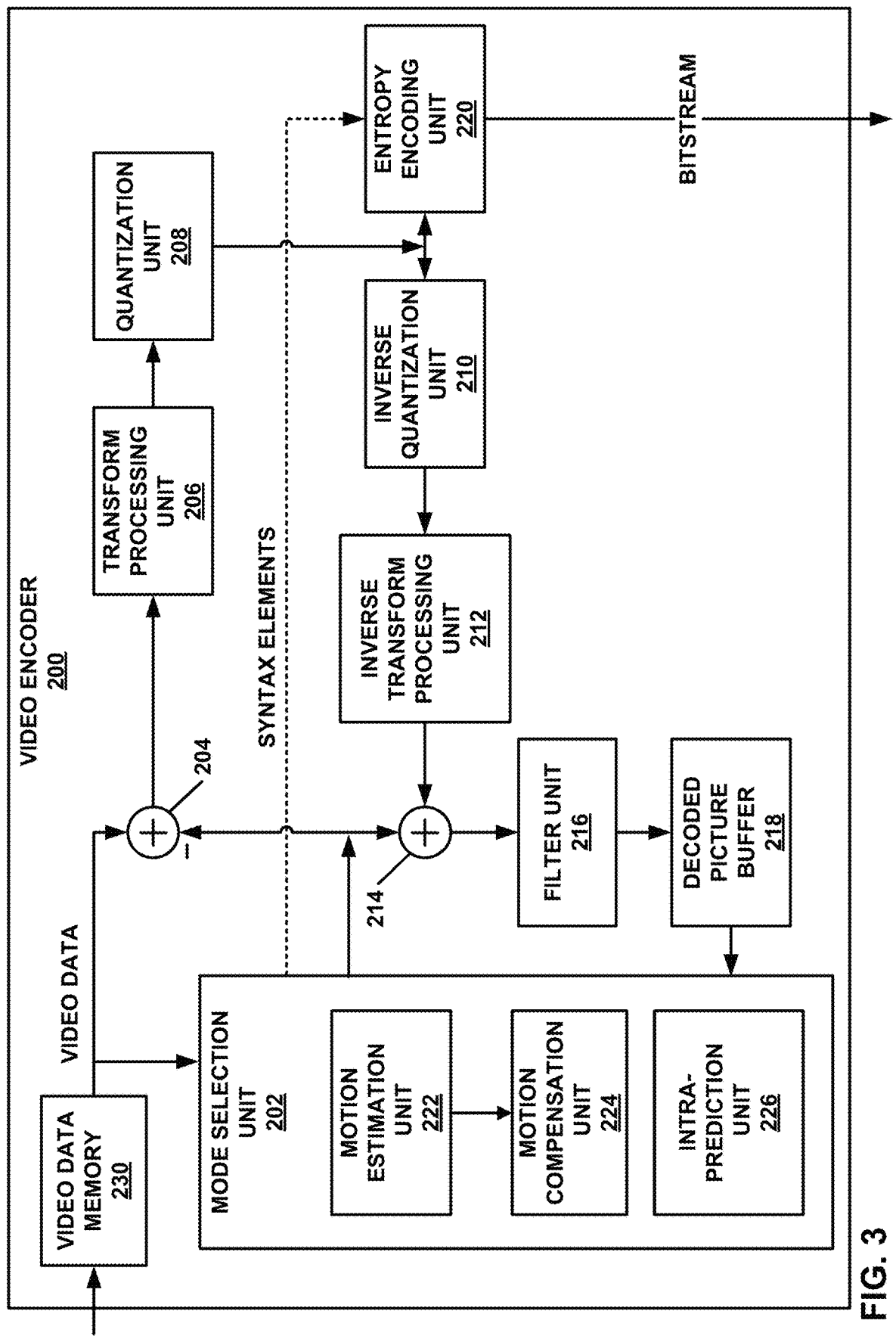
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 210 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block. As discussed herein, transform processing unit 206 may selectively apply different transforms to different coefficient blocks (i.e., blocks of transform coefficients).

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 224 are not needed, reconstruction unit 214 may store reconstructed blocks to DPB 218. In examples where operations of filter unit 224 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to derive, for a current coefficient block of a video block, a transform type from a plurality of transform types. The video coder may transform, using the selected transform type, the current coefficient block to obtain a block of reconstructed residual data for the video block; and reconstruct, based on the reconstructed residual data for the video block, the video block.

Figure 4:
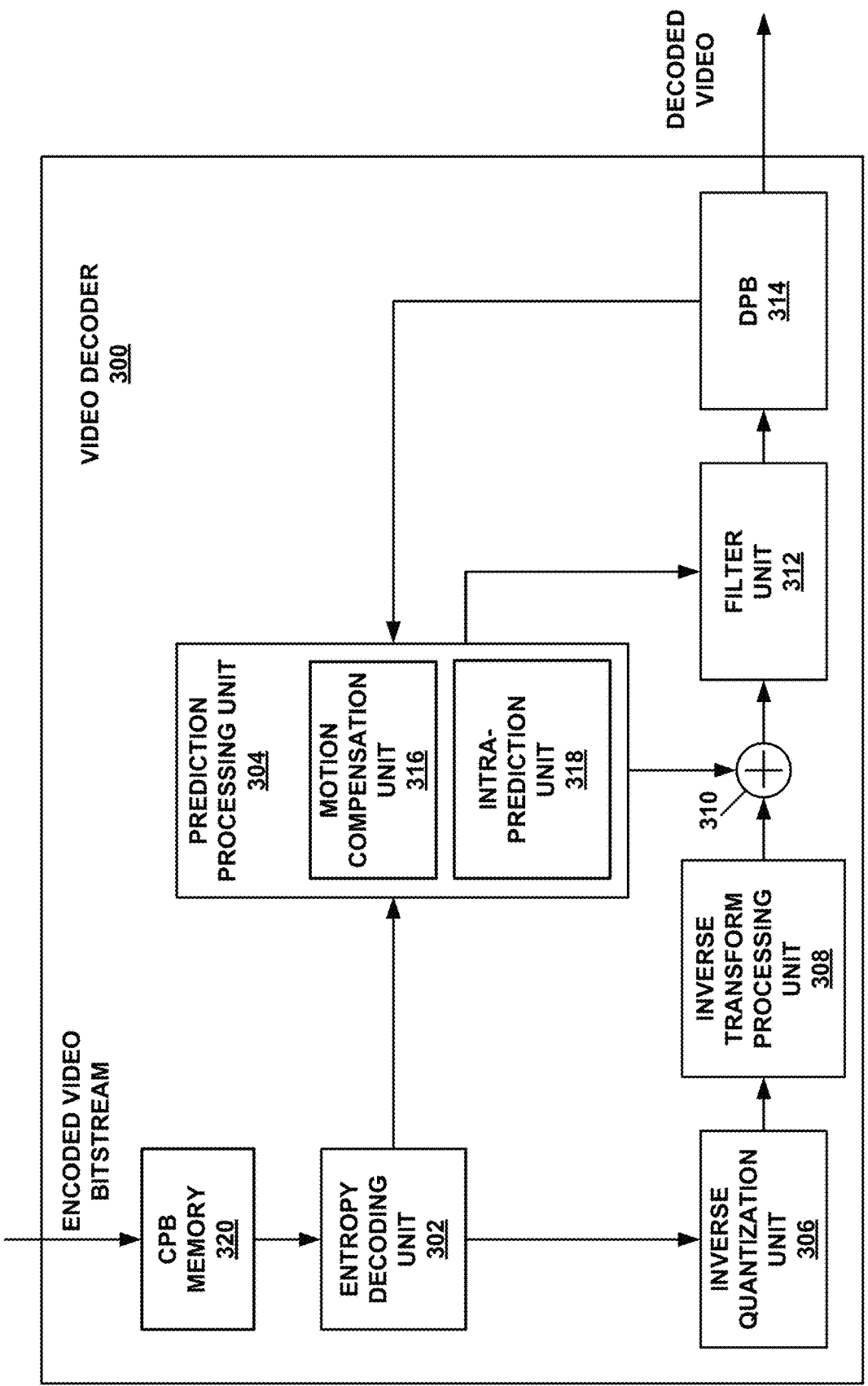
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 is described according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 318), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block. As discussed herein, transform processing unit 206 may selectively apply different transforms to different coefficient blocks (i.e., blocks of transform coefficients).

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to derive, for a current coefficient block of a video block, a transform type from a plurality of transform types. The video coder may transform, using the selected transform type, the current coefficient block to obtain a block of reconstructed residual data for the video block; and reconstruct, based on the reconstructed residual data for the video block, the video block.

Figure 5:
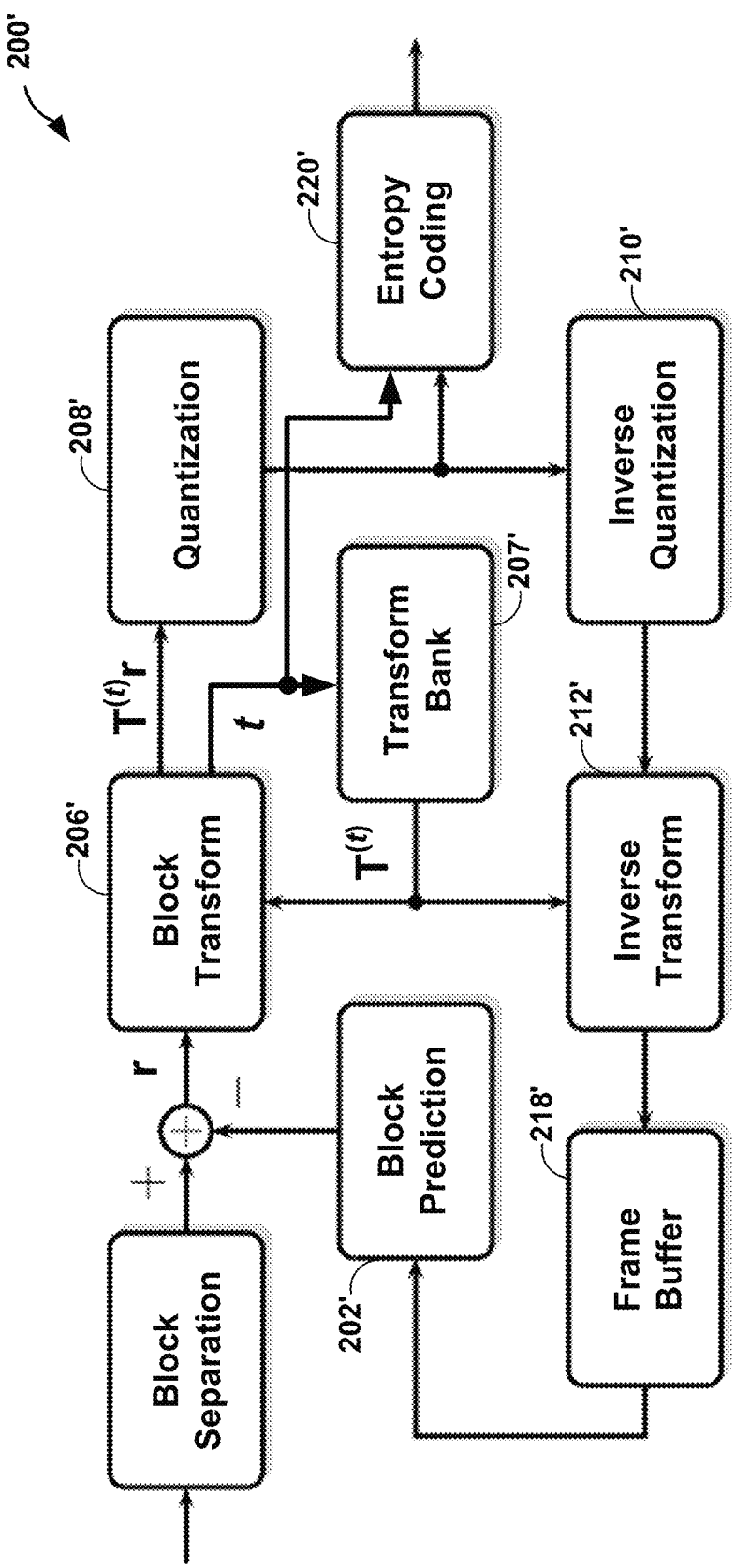
FIG. 5 is a block diagram illustrating a system for hybrid video encoding with adaptive transform selection.

FIG. 5 is a block diagram illustrating a system for hybrid video encoding with adaptive transform selection. Video encoder 200' of FIG. 5 may be considered to illustrate a video encoding system similar to video encoder 200 of FIGS. 1 and 3. For example, block prediction 202', block transform 206', quantization 208', Inverse quantization 210', Inverse transform 212', Frame buffer 218', and Entropy coding 220' of video encoder 200' may be considered to perform operations similar to mode selection unit 202, transform processing unit 206, quantization unit 208, inverse quantization unit 210, inverse transform processing unit 212, decoded picture buffer 218, and entropy encoding unit 220 of video encoder 200 of FIG. 3. As shown in FIG. 5, video encoder 200' may include transform bank 207', which may be configured to operate in conjunction with Block transform 206' to transform residual data. For instance, transform bank 207' and block transform 206' may collectively select and perform various transforms (e.g., various DCT or DST) for each block of prediction residuals. As discussed above, in some examples, transform bank 207' and block transform 206' may signal the choice of transform a side information. For instance, block transform 206' may cause entropy coding 220' to encode a syntax element explicitly indicating the transform used (i.e., t).

Figure 6:
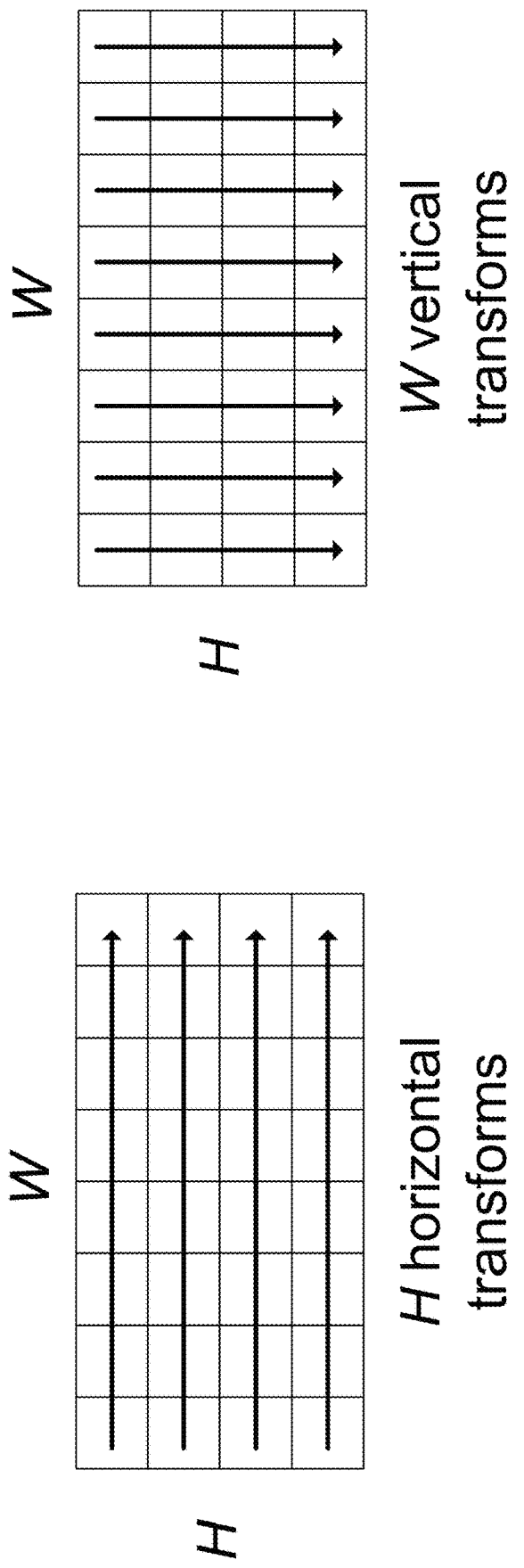
FIG. 6 is a conceptual diagram illustrating separable transform implementation with horizontal and vertical lines being transformed independently.

In some examples, Transform bank 207' and Block transform 206' may compute the block transforms in a separable manner. For instance, to reduce computation complexity, transform bank 207' and block transform 206' may transform the horizontal and vertical lines independently as shown in FIG. 6. In other words, samples along the horizontal and vertical arrows in FIG. 6 may be transformed independently.

In video coding standards prior to HEVC, only a fixed separable transform is used where DCT-2 is used both vertically and horizontally. In HEVC, in addition to DCT-2, DST-7 is also employed for 4×4 blocks as a fixed separable transform. US-2016-0219290-A1 and US-2018-0020218-A1 describe adaptive extensions of those fixed transforms, and an example of AMT in US-2016-0219290-A1 has been adopted in the Joint Experimental Model (JEM) of the Joint Video Experts Team (JVET), Joint Video Experts Team (JVET) of ITU-T SG 16 WP 3 and ISO/IEC JTC 1/SC 29/WG 11, JEM Software, https://jvet.hhi.fraunhofer.de/svn/svn HMJEMSoftware/tags/HM-16.6-JEM-7.0.

In accordance with one or more techniques of this disclosure, a video coder (e.g., a video encoder and/or a video decoder) may perform implicit transform selection. For instance, the video coder may apply one or more sets of rules to implicitly select a transform for transforming residual data for a block. In this way, the video coder may improve coding efficiency. In particular, the techniques of this disclosure enable the video decoder to obtain the benefits of using adaptive transform selection without the overhead of actually signaling the transform selected.

In VVC Draft 4, there are two implicit transform derivations that are relatively complicated and do not provide good coding performance. This disclosure proposed simpler alternative derivations that may provide similar or even better compression/coding performance/efficiency The related techniques in VVC Draft 4 and reference software VTM-4.0) are discussed below.

In VVC Draft 4/VTM-4.0, multiple transform selection (MTS) uses a high-level flag to determine whether the transform is (i) explicitly signaled to select among multiple candidates, or (ii) implicitly derived based on block shape. In the latter case, combinations of DST-7 and DCT-2 as horizontal or vertical transforms up to size 16. Specifically, following block-shape dependent conditions define the implicit MTS in VTM-4.0:
  If the width and height of a block are equal and both are less than or equal to 16, DST-7 is used in both horizontal and vertical directions.
  If the width of a block is smaller than its height and it is less than or equal to 16, DST-7 is in horizontal and DCT-2 is used in vertical direction.

If the height of a block is smaller than its width and it is less than or equal to 16, DST-7 is in vertical and DCT-2 is used in horizontal direction.

Otherwise, DCT-2 is used in both directions.

In VVC Draft 4/VTM-4.0, when intra-subblock partitioning (ISP) is used to code luma blocks, a mode-dependent transform selection is made, where horizontal and vertical transforms (trTypeHor and trTypeVer) are derived based on the following table in VVC Draft 4.

TABLE

Specification of trTypeHor and trTypeVer depending on predModeIntra

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | (nTbW >= 4 && nTbW <= 16) ? 1:0 | ( nTbH >= 4 && nTbH <=16) ? 1:0 |
| INTRA_ANGULAR33, INTRA_ANGULAR35 | 0 | 0 |
| INTRA_ANGULAR2, INTRA_ANGULAR4, . . ., INTRA_ANGULAR28, INTRA_ANGULAR30, INTRA_ANGULAR39, INTRA_ANGULAR41, . . ., INTRA_ANGULAR63, INTRA_ANGULAR65 | ( nTbW >= 4 && nTbW <=16) ? 1:0 | 0 |
| INTRA_ANGULAR3, INTRA_ANGULAR5, . . ., INTRA_ANGULAR27, INTRA_ANGULAR29, INTRA_ANGULAR38, INTRA_ANGULAR40, . . ., INTRA_ANGULAR64, INTRA_ANGULAR66 | 0 | ( nTbH >= 4 && nTbH <= 16) ? 1:0 |

As discussed above and in accordance with one or more techniques of this disclosure, a video coder may apply one or more rule sets to implicitly derive transform selection based on available side information.

Figure 7:
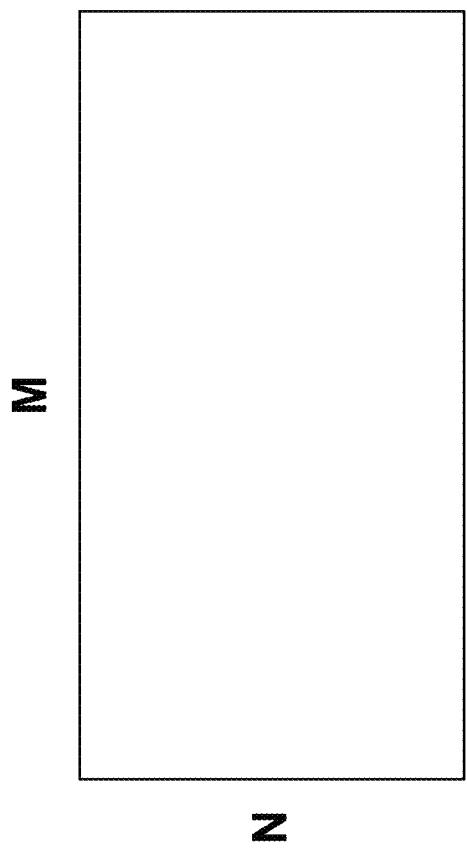
FIG. 7 is a conceptual diagram illustrating an example block for which a video coder may implicitly derive transforms, in accordance with one or more techniques of this disclosure.

As a first example, a video coder may determine that a coding unit/transform unit (CU/TU) is coded using DST-7 only under certain conditions. For instance, if the maximum 1-D transform size allowed is N in a codec, the video coder may determine that DST-7 may be used for all possible sizes. For example, for a given N×M block (as shown in FIG. 7 whose N rows have M samples each, and its M columns have N samples), the video coder may determine that N-point DST-7 may be used vertically and M-point DST-7 may be used horizontally.

As a second example, for a selected set of dimensions, the video coder may determine that different combinations of DST-7 and DCT-2 can be used. For instance, the video coder may determine that DST-7 can be applied for any row or column with less than or equal to K samples, while DCT-2 can be used to transform any row or column with number of samples greater than K. For example, in the example of FIG. 7, if N is smaller than K and M is larger than K, the video coder may determine to use N-point DST-7 vertically and M-point DCT-2 horizontally. Also in the example of FIG. 7, if both N and M are smaller than K, the video coder may determine to use DST-7 both horizontally and vertically.

As a third example, if a CU/TU is partitioned, the video decoder may determine that all partitions can use the same implicit transform selection scheme. In some examples, the video coder may use DST-7 for all partitioned sub-blocks (sub TUs or sub CUs). In some examples, the video coder may use combinations of DST-7 and DCT-2 depending on the block dimensions after partitioning. In some examples, for coding blocks that use the intra-subblock partitioning (ISP) in VVC (VTM-4.0), the video coder may use combinations of DST-7 and DCT-2 depending on the dimensions of the block as discussed above in the second example. For example, for any row or column with less than or equal to 16 samples, the video coder may DST-7. Otherwise, the video coder may use DCT-2 to transform any row or column with number of samples greater than 16. In some examples, as ISP can have rows/columns with two samples, the video coder may use 2-point DST-7. In previous standards, 2-point DST-7 has not been used. As such, the video coder may use modified entries of the 2-point DST-7 matrix as follows:

$$\{48, 77\}$$

$$\{77, -48\}$$

Figure 8:
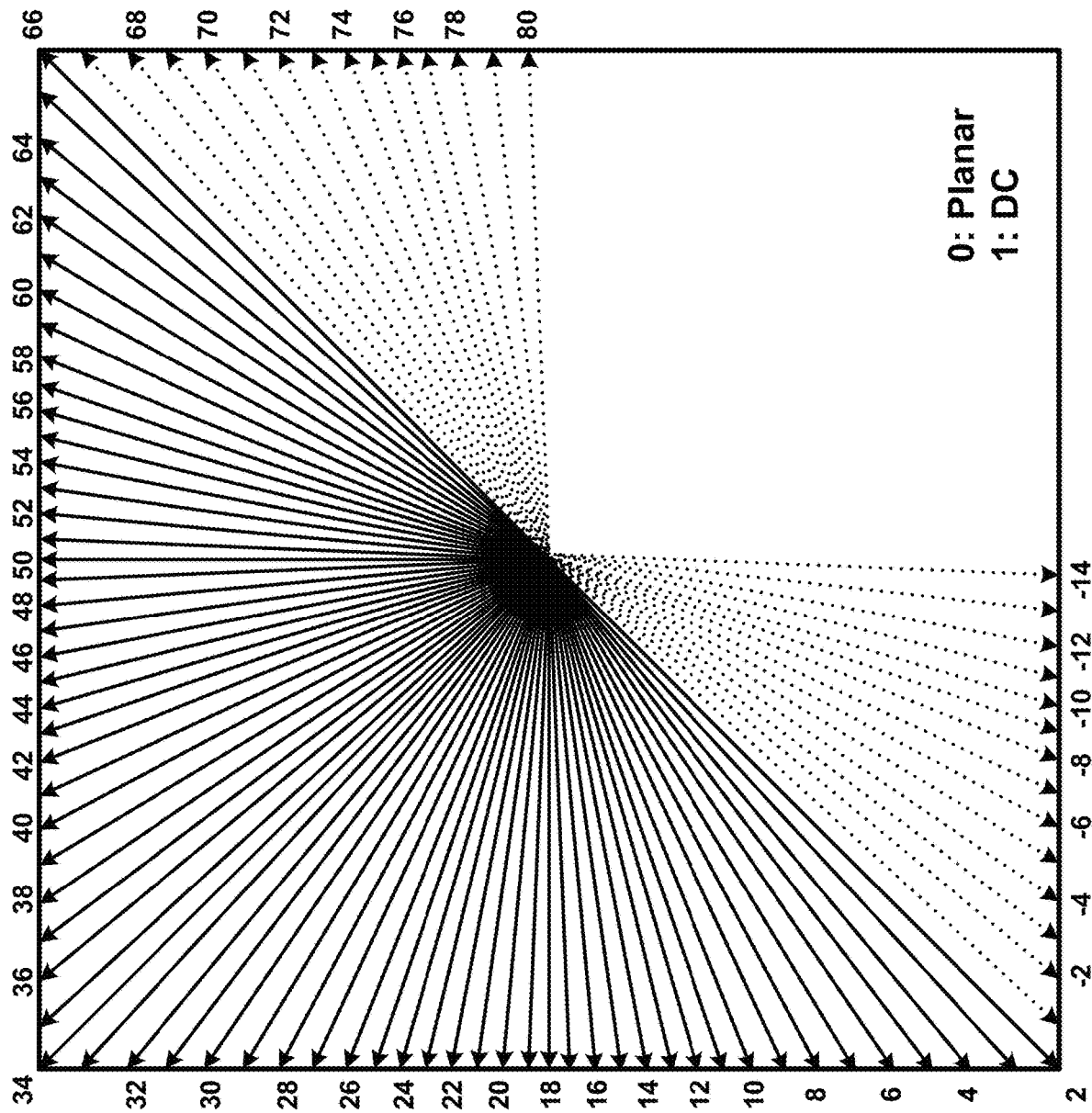
FIG. 8 is a conceptual diagram illustrating intra prediction directions.

As a fourth example, the video coder may derive the transform based on intra prediction modes (modes are illustrated in FIG. 8). For intra planar and DC modes, the video coder may use DST-7 in both horizontal and vertical directions. For intra diagonal angular mode (mode index 34 in FIG. 8), the video coder may use DST-7 in both horizontal and vertical directions. For angular modes, indexed from 2 to 66, the video coder may apply different combinations of DSTs/DCTs to certain range of modes such as predefined intervals of mode indices between mode indices [2, 3, . . . , 65, 66].

1) The range of intervals consisting of all angular modes [2, 3, . . . , 66] can be defined as follows for a given integer T between 2 and 30:
 a. $R_1=[2, \ldots, (33-T)]$
 b. $R_2=[(34-T), \ldots, (34+T)]$
 c. $R_3=[(35+T), \ldots, 66]$ 2) DST-7 can be applied both horizontally and vertically for the angular modes in range $R_2$.

3) DST-7 can be applied horizontally and DCT-2 vertically for the angular modes in range $R_1$.

4) DCT-2 can be applied horizontally and DST-7 vertically for the angular modes in range $R_3$.

As a fifth example, other than DST-7 and DCT-2, the video coder may apply combinations of different types of DCTs/DSTs (e.g., DST-4 and DCT-8) and 1-D identity transform.

As a sixth example, the video coder may apply one or more combinations of the above examples for intra predicted CU/TUs only.

As a seventh example the video coder may apply one or more combinations of the above examples for inter predicted CU/TUs only.

As an eighth example the video coder may apply one or more combinations of the above examples used for both intra and inter predicted CU/TUs.

As a ninth example the video coder may apply one or more combinations of the above examples used for luma or chroma channels or both luma and chroma channels.

Figure 9:
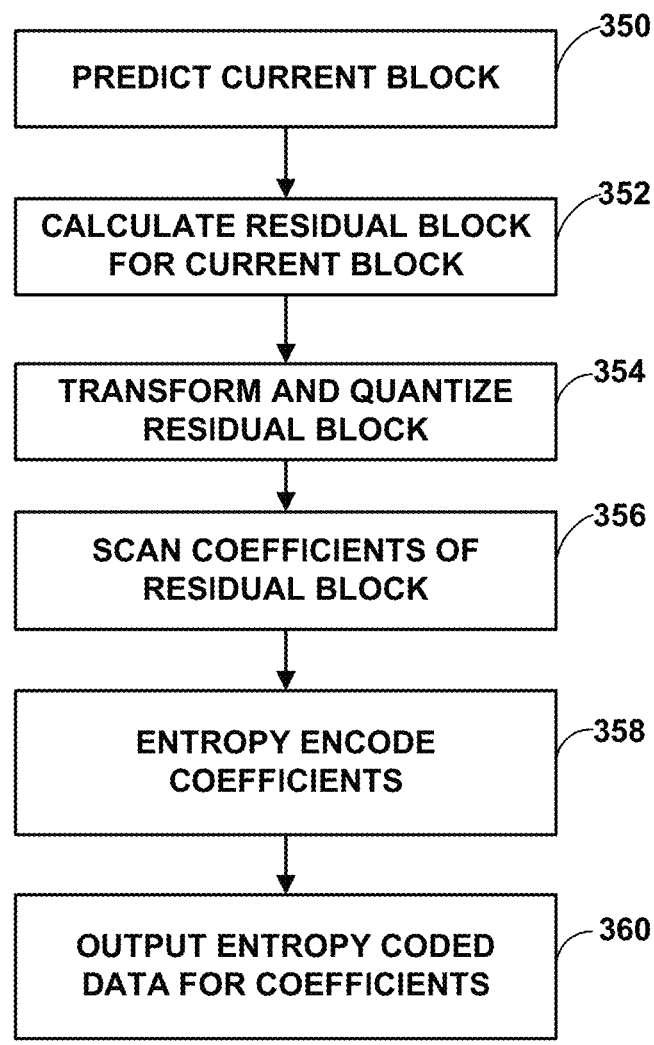
FIG. 9 is a flowchart illustrating an example method for encoding a current block.

FIG. 9 is a flowchart illustrating an example method for encoding a current block. The current block may comprise a current CU. Although described with respect to video encoder 200 (FIGS. 1 and 3), it should be understood that other devices may be configured to perform a method similar to that of FIG. 9. For instance, video encoder 200' of FIG. 5 may perform a method similar to that of FIG. 9.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). As discussed above, video encoder 200 may implicitly derive a transform type to use when transforming the coefficients of the residual block. For instance, video encoder 200 may derive the transform type using the technique discussed below with reference to FIG. 11.

Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 10:
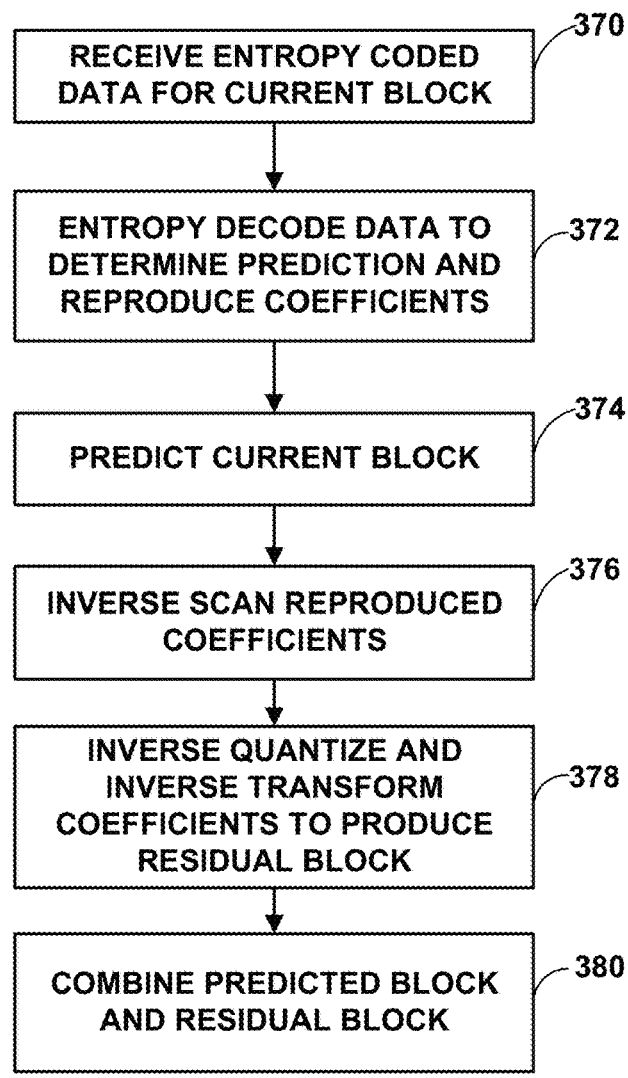
FIG. 10 is a flowchart illustrating an example method for decoding a current block.

FIG. 10 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 10.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). As discussed above, video decoder 300 may implicitly derive a transform type to use when transforming the coefficients of the residual block. For instance, video decoder 300 may derive the transform type using the technique discussed below with reference to FIG. 11. Video decoder 300 may ultimately decode the current block by combining the prediction block and the residual block (380).

Figure 11:
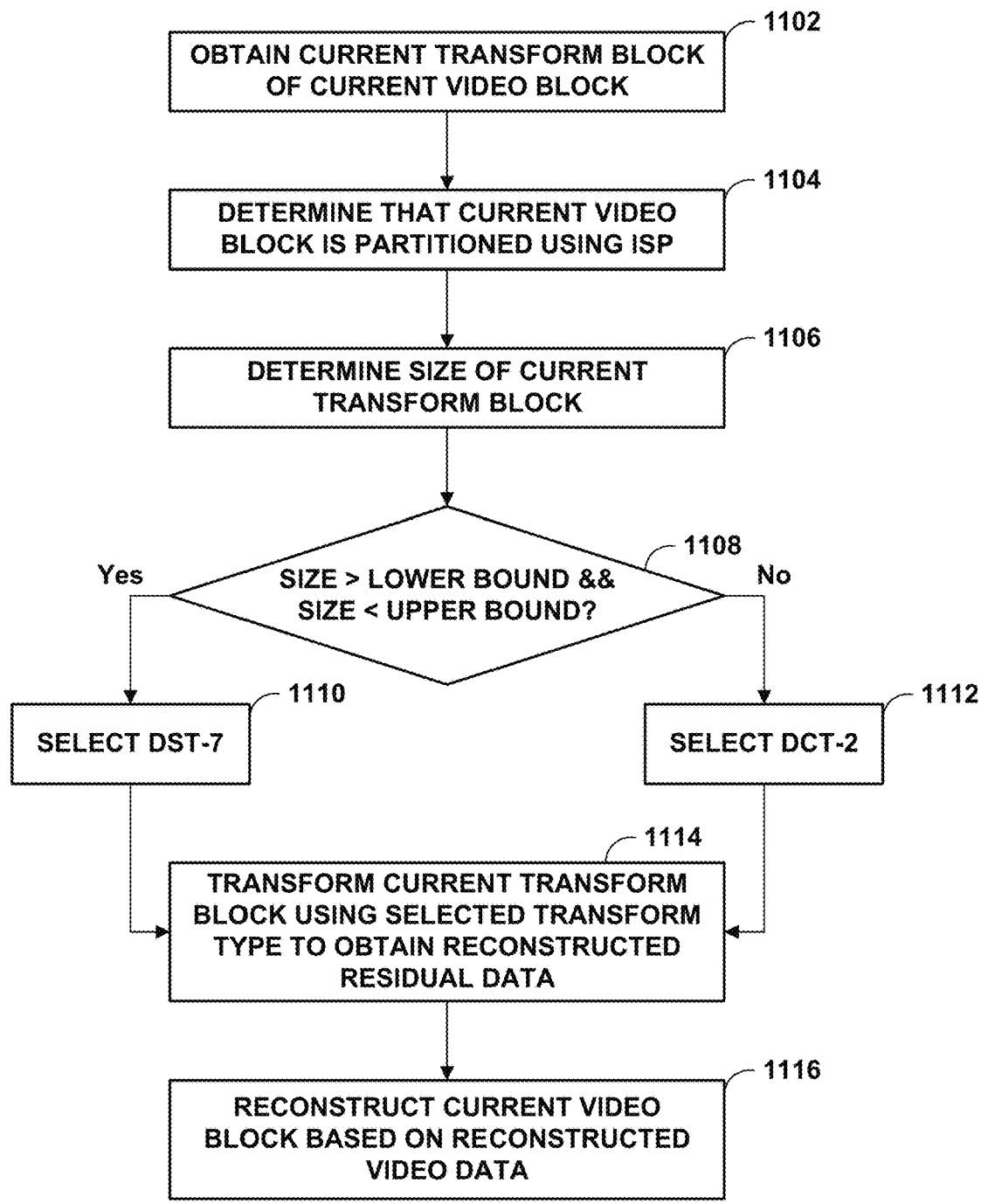
FIG. 11 is a flowchart illustrating an example method for inferring a transform type for a transform block of a video block, in accordance with one or more techniques of this disclosure.

FIG. 11 is a flowchart illustrating an example method for inferring a transform type for a transform block of a video block, in accordance with one or more techniques of this disclosure. The techniques of FIG. 11 may be performed by a video coder (e.g., video encoder 200 and/or video decoder 300).

A video coder may obtain a current transform block of a current video block (1102). The transform block may be a matrix of transform coefficients that is constructed based on one or more syntax elements decoded from a video bitstream (e.g., the syntax elements included in the residual coding syntax table of VVC Draft 4. The current video block may be a coding unit (CU).

The video coder may infer a transform type from a plurality of transform types for the current transform block. The plurality of transform types may include one or more discrete cosine transforms (DCTs) and one or more discrete sine transforms (DSTs).

As discussed above, the video coder may infer the transform type based on one or more factors, such as whether the current video block is partitioned using ISP and/or a size of the transform block. As shown in FIG. 11, the video coder may determine that the current video block is partitioned using ISP (1104). The video coder may determine that the current video block is partitioned using ISP based on the values of one or more syntax elements (e.g., sps_isp_enabled_flag, intra_subpartitions_mode_flag, and/or intra_subpartitions_split_flag). For instance, based on the intra_subpartitions_split_flag syntax element, the video coder may determine whether the current video block is not partitioned (e.g., not split), is partitioned horizontally, or is partitioned vertically.

Responsive to determining that the current video block is partitioned using ISP (1104), the video coder may determine a size of the current transform block (1106). For instance, the video coder may determine a width and/or a height of the transform block. In some examples, the video coder may separately determine transform block size for each sub-partition. In other examples, the video coder may determine transform block size for a single partition and utilize the determined size for each partition of the coding unit.

The video coder may determine whether the size of the current transform block satisfies a size threshold. For instance, as shown in FIG. 11, the video coder may determine whether the size of the current transform block is greater than a lower bound and less than an upper bound (i.e., whether both (size>lower bound) and (size<upper bound) are true) (1108). As discussed above, in some examples, the lower bound may be 4 samples and the upper bound may be 16 samples).

Responsive to determining that the size of the current transform block satisfies the size threshold and that the current video block is partitioned using ISP, the video coder may select a particular DST of the one or more DSTs as the selected transform type. For instance, as shown in FIG. 11, responsive to determining that the size of the current transform block satisfies the size threshold and that the current video block is partitioned using ISP, the video coder may select DST-7 as the inferred transform type for the current transform block ("Yes" branch of 1108, 1110). Alternatively, responsive to determining that the size of the current transform block does not satisfy the size threshold and that the current video block is partitioned using ISP, the video coder may select DCT-2 as the inferred transform type for the current transform block ("No" branch of 1108, 1112).

The video coder may transform, using the selected transform type, the current transform block to obtain a block of reconstructed residual data for the video block (1114). For instance, where the selected transform type is DST-7, the video coder (e.g., inverse transform processing unit 212/212' of video encoder 200/200' and/or inverse transform processing unit 308 of video decoder 300) may transform the coefficients of the transform block into the reconstructed residual data by applying an inverse DST-7 transform.

The video coder may reconstruct, based on the reconstructed residual data for the video block, the video block (1116). For instance, the video encoder may add the residual data to a block of intra predicted samples for the current block. Where the video block is partitioned using ISP, the video encoder may add a respective block of reconstructed residual data to a respective block of intra predicted samples for each respective sub-partition of the current video block.

The following numbered examples may illustrate one or more aspects of the disclosure:

Example 1. A method of coding video data, the method comprising: deriving, for a current coefficient block of a video block, a transform type from a plurality of transform types; transforming, using the selected transform type, the current coefficient block to obtain a block of reconstructed residual data for the video block; and reconstructing, based on the reconstructed residual data for the video block, the video block.

Example 2. The method of example 1, wherein the plurality of transform types includes one or more discrete cosine transforms (DCTs) and/or one or more discrete sine transforms (DSTs).

Example 3. The method of example 2, wherein the one or more DCTs include one or more of a DCT-1, a DCT-2, a DCT-3, a DCT-4, a DCT-5, a DCT-6, a DCT-7, and a DCT-8.

Example 4. The method of any of examples 2 and 3, wherein the one or more DSTs include one or more of a DST-1, a DST-2, a DST-3, a DST-4, a DST-5, a DST-6, a DST-7, and a DST-8.

Example 5. The method of any of examples 1-4, wherein deriving the transform type comprises deriving the transform type based on a size of the current coefficient block.

Example 6. The method of example 5, wherein deriving the transform type based on the size of the current coefficient block comprises selecting the DST-7 transform type where a maximum 1-D transform size allowed is N.

Example 7. The method of example 6, wherein the current coefficient block has dimensions of N×M, and wherein selecting the DST-7 transform type comprises selecting an N-point DST-7 transform for vertical use and selecting an M-point DST-7 transform for horizontal use.

Example 8. The method of any combination of examples 1-7, wherein deriving the transform type comprises selecting different combinations of the DST-7 transform and the DCT-2 transform.

Example 9. The method of example 8, wherein selecting different combinations of the DST-7 transform and the DCT-2 transform comprises: selecting the DST-7 transform for any row or column with less than or equal to K samples; and selecting the DCT-2 transform for any row or column with greater than K samples.

Example 10. The method of any combination of examples 1-9, further comprising: responsive to determining that the video block is partitioned into a plurality of partitions, selecting respective transform types for coefficient blocks of each of the plurality of partitions using a common rule set.

Example 11. The method of example 10, wherein selecting respective transform types for each of the plurality of partitions comprises selecting the DST-7 for coefficient blocks of all of the plurality of partitions.

Example 12. The method of example 10, wherein selecting respective transform types for each of the plurality of partitions comprises selecting different combinations of the DST-7 transform and the DCT-2 transform based on dimensions of the partitions.

Example 13. The method of example 12, wherein selecting different combinations of the DST-7 transform and the DCT-2 transform based on dimensions of the partitions comprises: selecting the DST-7 transform for any row or column with less than or equal to a threshold number of samples; and selecting the DCT-2 transform for any row or column with greater than the threshold number of samples.

Example 14. The method of example 13, wherein the threshold is 16.

Example 15. The method of any combination of examples 10-14, wherein partitioning the video block into the plurality of partitions comprises partitioning the video block using intra-subblock partitioning (ISP).

Example 16. The method of example 15, wherein transforming using the DST-7 transform comprises transforming the current coefficient block using the following 2-point DST-7 matrix:

$$\{48, 77\}$$
$$\{77, -48\}.$$

Example 17. The method of any combination of examples 1-16, further comprising: determining an intra prediction mode used to predict the video block, wherein deriving the transform type for the current coefficient block of the video block comprises deriving the transform type for the current coefficient block of the video block based on the intra prediction mode.

Example 18. The method of example 17, wherein deriving the transform type for the current coefficient block of the video block based on the intra prediction mode comprises: responsive to determining that the intra prediction mode is a planar or a DC mode, selecting the DST-7 transform for the current coefficient block in both horizontal and vertical directions.

Example 19. The method of any of examples 17 or 18, wherein deriving the transform type for the current coefficient block of the video block based on the intra prediction mode comprises: responsive to determining that the intra prediction mode is a diagonal angular mode, selecting the DST-7 transform for the current coefficient block in both horizontal and vertical directions.

Example 20. The method of example 19, wherein the diagonal angular mode is mode index 34.

Example 21. The method of any of examples 17-20, wherein deriving the transform type for the current coefficient block of the video block based on the intra prediction mode comprises: responsive to determining that the intra prediction mode is an angular mode, selecting the transform type for the current coefficient block based on a mode index of the intra prediction mode.

Example 22. The method of example 21, wherein selecting the transform type for the current coefficient block based on the mode index of the intra prediction mode comprises: identifying a range of a plurality of ranges that includes the mode index of the intra prediction mode; and selecting the transform type for the current coefficient block based on the identified range.

Example 23. The method of example 22, wherein identifying the range comprises: identifying a first range in response to determining that the mode index is between a first threshold and a second threshold; identifying a second range in response to determining that the mode index is between the second threshold and a third threshold; and identifying a third range in response to determining that the mode index is between the third threshold and a fourth threshold.

Example 24. The method of example 23, wherein: identifying the first range in response to determining that the mode index is between the first threshold and the second threshold comprises identifying the first range in response to determining that the mode index is within $[2, \ldots, (33-T)]$; identifying the second range in response to determining that the mode index is between the second threshold and the third threshold comprises identifying the second range in response to determining that the mode index is within [(34−T), . . . , (34+T)]; identifying a third range in response to determining that the mode index is between the third threshold and the fourth threshold comprises identifying the third range in response to determining that the mode index is within [(35+T), . . . , 66]; and T is an integer between 2 and 30.

Example 25. The method of example 23 or example 24, wherein selecting the transform type for the current coefficient block based on the identified range comprises: selecting the DST-7 for horizontal use and the DCT-2 for vertical use in response to identifying the first range; selecting the DST-7 for horizontal and vertical use in response to identifying the second range; and selecting the DCT-2 for horizontal use and the DST-7 for vertical use in response to identifying the third range.

Example 26. The method of any of examples 1-25, wherein coding comprises decoding.

Example 27. The method of any of examples 1-26, wherein coding comprises encoding.

Example 28. A device for coding video data, the device comprising one or more means Example for performing the method of any of examples 1-27.

Example 29. The device of example 28, wherein the one or more means comprise one or more processors implemented in circuitry.

Example 30. The device of any of examples 28 and 29, further comprising a memory to store the video data.

Example 31. The device of any of examples 28-30, further comprising a display configured to display decoded video data.

Example 32. The device of any of examples 28-31, wherein the device comprises one or more of a camera, a computer, a mobile device, a broadcast receiver device, or a set-top box.

Example 33. The device of any of examples 28-32, wherein the device comprises a video decoder.

Example 34. The device of any of examples 28-33, wherein the device comprises a video encoder.

Example 35. A computer-readable storage medium having stored thereon instructions that, when executed, cause one or more processors to perform the method of any of examples 1-25.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
inferring, for a current transform block of a current video block, a transform type from a plurality of transform types that includes one or more discrete cosine transforms (DCTs) and one or more discrete sine transforms (DSTs), wherein inferring the transform type comprises:

determining whether a size of the current transform block satisfies a size threshold, wherein the size of the current transform block satisfies the size threshold where the size of the current transform block is greater than or equal to 4 and less than or equal to 16;

determining whether the current video block is partitioned using intra-subblock partitioning (ISP);

responsive to determining that the size of the current transform block satisfies the size threshold and that the current video block is partitioned using ISP, selecting a particular DST of the one or more DSTs as the selected transform type, wherein selecting the particular DST comprises selecting the particular DST regardless of an intra prediction mode selected to predict the current video block, wherein the particular DST is a DST-7; and responsive to determining that the size of the current transform block does not satisfy the size threshold and that the current video block is partitioned using ISP, selecting a particular DCT of the one or more DCTs as the selected transform type, wherein the particular DCT is a DCT-2;

transforming, using the selected transform type, the current transform block to obtain a block of reconstructed residual data for the video block; and reconstructing, based on the reconstructed residual data for the video block, the video block, wherein inferring the transform type for the current transform block comprises inferring the transform type for the current transform block responsive to determining that multiple transform selection (MTS) is enabled for the current video block wherein determining whether the current video block is partitioned using ISP comprises determining, based on values of one or more syntax elements decoded from a video bitstream, whether the current video block is partitioned using ISP, wherein the size of the current transform block comprises:
a width of the current transform block; and
a height of the current transform block, wherein selecting the transform type comprises selecting a transform type for horizontal use and selecting a transform type for vertical use, the method further comprising:

selecting the DST-7 as the selected transform type for horizontal use responsive to determining that the width of the current transform block satisfies a width size threshold and that the current video block is partitioned using ISP; and selecting the DST-7 as the selected transform type for vertical use responsive to determining that the height of the current transform block satisfies a height size threshold and that the current video block is partitioned using ISP, and wherein the width threshold equals the height threshold.

2. The method of claim 1, wherein the one or more DCTs include one or more of a DCT-1, the DCT-2, a DCT-3, a DCT-4, a DCT-5, a DCT-6, a DCT-7, and a DCT-8.

3. The method of claim 2, wherein the one or more DSTs include one or more of a DST-1, a DST-2, a DST-3, a DST-4, a DST-5, a DST-6, the DST-7, and a DST-8.

4. A device for coding video data, the device comprising:
a memory configured to store video blocks; and
one or more processors implemented in circuitry and configured to:
infer, for a current transform block of a current video block, a transform type from a plurality of transform types that includes one or more discrete cosine transforms (DCTs) and one or more discrete sine transforms (DSTs), wherein, to infer the transform type, the one or more processors are configured to:

determine whether a size of the current transform block satisfies a size threshold, wherein the size of the current transform block satisfies the size threshold where the size of the current transform block is greater than or equal to 4 and less than or equal to 16;

determine whether the current video block is partitioned using intra- subblock partitioning (ISP);

select, responsive to determining that the size of the current transform block satisfies the size threshold and that the current video block is partitioned using ISP a particular DST of the one or more DSTs as the selected transform type, wherein to select the particular DST, the one or more processors are configured to select the particular DST regardless of an intra prediction mode selected to predict the current video block, wherein the particular DST is a DST-7; and select, responsive to determining that the size of the current transform block does not satisfy the size threshold and that the current video block is partitioned using ISP, a particular DCT of the one or more DCTs as the selected transform type, wherein particular DCT is a DCT-2;

transform, using the selected transform type, the current transform block to obtain a block of reconstructed residual data for the video block; and reconstruct, based on the reconstructed residual data for the video block, the video block, wherein, to infer the transform type for the current transform block, the one or more processors are configured to infer the transform type for the current transform block responsive to determining that multiple transform selection (MTS) is enabled for the current video block, wherein, to determine whether the current video block is partitioned using ISP, the one or more processors are configured to determine, based on values of one or more syntax elements decoded from a video bitstream, whether the current video block is partitioned using ISP, wherein the size of the current transform block comprises:
a width of the current transform block; and
a height of the current transform block wherein, to select the transform type, the one or more processors are configured to select a transform type for horizontal use and selecting a transform type for vertical use, and wherein the one or more processors are further configured to:

select the DST-7 as the selected transform type for horizontal use responsive to determining that the width of the current transform block satisfies a width size threshold and that the current video block is partitioned using ISP; and select the DST-7 as the selected transform type for vertical use responsive to determining that the height of the current transform block satisfies a height size threshold and that the current video block is partitioned using ISP, and wherein the width threshold equals the height threshold.

5. The device of claim 4, wherein the one or more DCTs include one or more of a DCT-1, the DCT-2, a DCT-3, a DCT-4, a DCT-5, a DCT-6, a DCT-7, and a DCT-8.

6. The device of claim 5, wherein the one or more DSTs include one or more of a DST-1, a DST-2, a DST-3, a DST-4, a DST-5, a DST-6, the DST-7, and a DST-8.

7. A computer-readable storage medium storing instructions that, when executed, cause one or more processors of a video coding device to:
  infer, for a current transform block of a current video block, a transform type from a plurality of transform types that includes one or more discrete cosine transforms (DCTs) and one or more discrete sine transforms (DSTs), wherein the instructions that cause the one or more processors to infer the transform type comprise instructions that cause the one or more processors to:
    determine whether a size of the current transform block satisfies a size threshold, wherein the size of the current transform block satisfies the size threshold where the size of the current transform block is greater than or equal to 4 and less than or equal to 16;
    determine whether the current video block is partitioned using intra-subblock partitioning (ISP); and
    select, responsive to determining that the size of the current transform block satisfies the size threshold and that the current video block is partitioned using ISP a particular DST of the one or more DSTs as the selected transform type, wherein the instructions that cause the one or more processors to select the particular DST comprise instructions that cause the one or more processors to select the particular DST regardless of an intra prediction mode selected to predict the current video block, wherein the particular DST is a DST-7; and
    select, responsive to determining that the size of the current transform block does not satisfy the size threshold and that the current video block is partitioned using ISP, a particular DCT of the one or more DCTs as the selected transform type, wherein particular DCT is a DCT-2;
  transform, using the selected transform type, the current transform block to obtain a block of reconstructed residual data for the video block; and
  reconstruct, based on the reconstructed residual data for the video block, the video block,
  wherein the instructions that cause the one or more processors to infer the transform type for the current transform block comprise instructions that cause the one or more processors to infer the transform type for the current transform block responsive to determining that multiple transform selection (MTS) is enabled for the current video block,
  wherein the instructions that cause the one or more processors to determine whether the current video block is partitioned using ISP comprise instructions that cause the one or more processors to determine, based on values of one or more syntax elements decoded from a video bitstream, whether the current video block is partitioned using ISP,
  wherein the size of the current transform block comprises:
    a width of the current transform block; and
    a height of the current transform block
  wherein the instructions that cause the one or more processors to select the transform type comprise instructions that cause the one or more processors to select a transform type for horizontal use and selecting a transform type for vertical use, and further comprising instructions that cause the one or more processors to:
    select the DST-7 as the selected transform type for horizontal use responsive to determining that the width of the current transform block satisfies a width size threshold and that the current video block is partitioned using ISP; and
    select the DST-7 as the selected transform type for vertical use responsive to determining that the height of the current transform block satisfies a height size threshold and that the current video block is partitioned using ISP, and
  wherein the width threshold equals the height threshold.

* * * * *